(12) United States Patent
Awoniyi-Oteri et al.

(10) Patent No.: US 12,471,096 B2
(45) Date of Patent: Nov. 11, 2025

(54) UPLINK SKIPPING AND UPLINK CONTROL INFORMATION MULTIPLEXING

(71) Applicant: QUALCOMM Incorporated, San Diego, CA (US)

(72) Inventors: Olufunmilola Omolade Awoniyi-Oteri, San Diego, CA (US); Tao Luo, San Diego, CA (US); Peter Gaal, San Diego, CA (US); Junyi Li, Fairless Hills, PA (US); Diana Maamari, San Diego, CA (US); Prashanth Haridas Hande, San Diego, CA (US); Jelena Damnjanovic, Del Mar, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 18/182,042

(22) Filed: Mar. 10, 2023

(65) Prior Publication Data
US 2023/0345514 A1 Oct. 26, 2023

Related U.S. Application Data

(60) Provisional application No. 63/363,375, filed on Apr. 21, 2022.

(51) Int. Cl.
*H04L 1/1607* (2023.01)
*H04L 1/1812* (2023.01)
(Continued)

(52) U.S. Cl.
CPC ........... *H04W 72/21* (2023.01); *H04L 1/1664* (2013.01); *H04L 1/1812* (2013.01);
(Continued)

(58) Field of Classification Search
CPC ........... H04L 1/12–1896; H04L 5/0001–0098; H04W 28/02–26; H04W 48/02–20; H04W 72/02–569; H04W 84/02–16; H04W 88/02–12; H04W 92/02–04; H04W 92/10
See application file for complete search history.

(56) References Cited

U.S. PATENT DOCUMENTS

2019/0223205 A1   7/2019   Papasakellariou
2021/0084673 A1*  3/2021   Nguyen ............ H04W 72/1268
(Continued)

OTHER PUBLICATIONS

International Search Report and Written Opinion—PCT/US2023/064311—ISA/EPO—Jun. 7, 2023.

*Primary Examiner* — Timothy J Weidner
(74) *Attorney, Agent, or Firm* — Harrity & Harrity, LLP

(57) ABSTRACT

Various aspects of the present disclosure generally relate to wireless communication. In some aspects, a user equipment (UE) may receive information identifying a set of uplink resources for a set of uplink transmissions. The UE may transmit a subset of the set of uplink transmissions, wherein the subset of the set of uplink transmissions includes uplink control information multiplexed from a remainder of the set of uplink transmissions corresponding to one or more instances in which data is not available for transmission. Numerous other aspects are described.

28 Claims, 16 Drawing Sheets

(51) Int. Cl.
*H04W 28/02* (2009.01)
*H04W 28/04* (2009.01)
*H04W 72/02* (2009.01)
*H04W 72/1268* (2023.01)
*H04W 72/21* (2023.01)
*H04W 72/51* (2023.01)
*H04W 72/53* (2023.01)
*H04W 84/02* (2009.01)
*H04W 88/02* (2009.01)
*H04W 88/08* (2009.01)
*H04W 92/02* (2009.01)
*H04W 92/10* (2009.01)

(52) U.S. Cl.
CPC ....... *H04W 28/0205* (2013.01); *H04W 28/04* (2013.01); *H04W 72/02* (2013.01); *H04W 72/1268* (2013.01); *H04W 72/51* (2023.01); *H04W 72/53* (2023.01); *H04W 84/02* (2013.01); *H04W 88/02* (2013.01); *H04W 88/08* (2013.01); *H04W 92/02* (2013.01); *H04W 92/10* (2013.01)

(56) References Cited

U.S. PATENT DOCUMENTS

| | | | |
|---|---|---|---|
| 2021/0168783 A1* | 6/2021 | Islam | H04W 72/1268 |
| 2021/0360685 A1 | 11/2021 | Huang et al. | |
| 2023/0379920 A1* | 11/2023 | Deghel | H04W 72/1268 |

\* cited by examiner

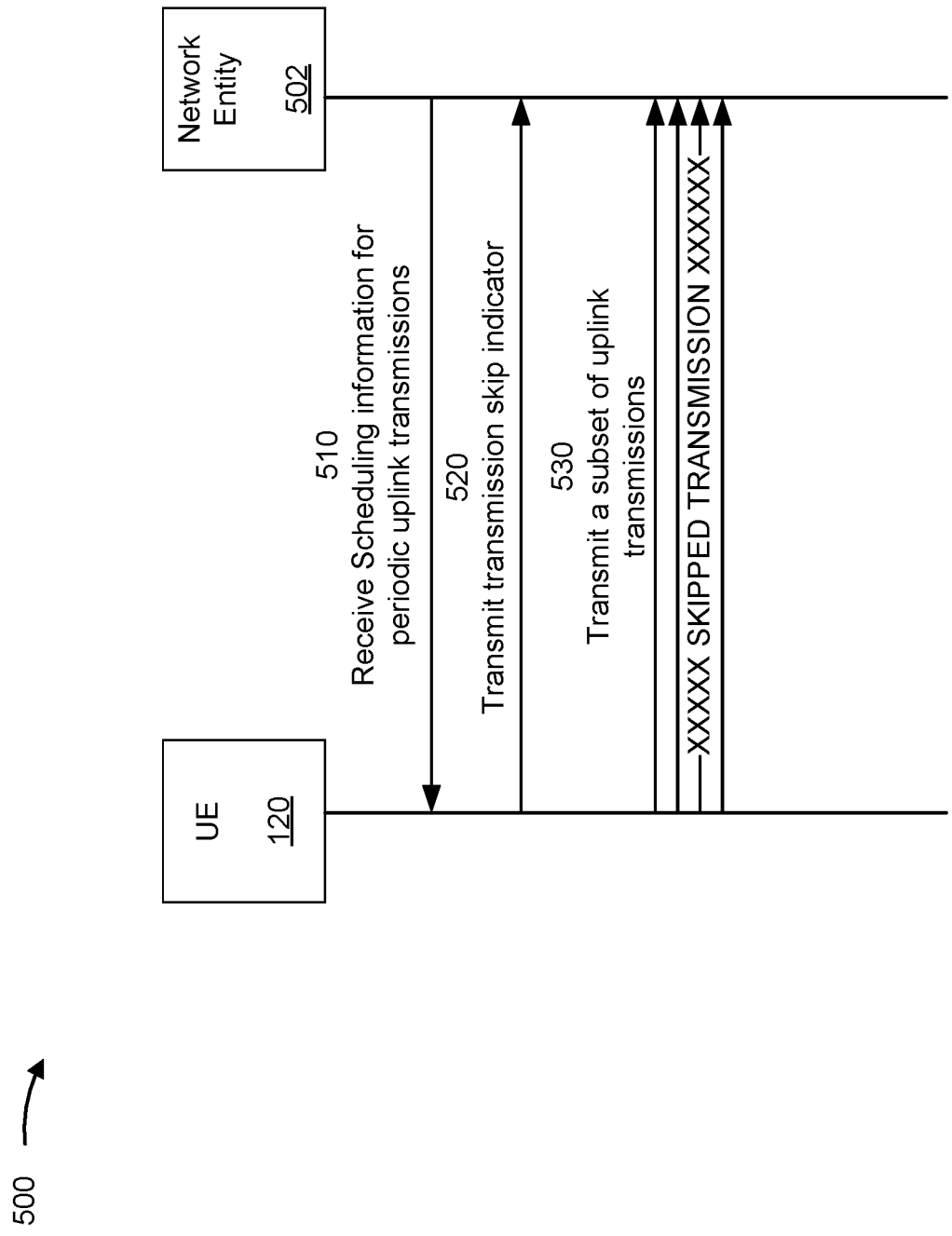

UPLINK SKIPPING AND UPLINK CONTROL INFORMATION MULTIPLEXING

CROSS-REFERENCE TO RELATED APPLICATION

This Patent Applications claims priority to U.S. Provisional Patent Application No. 63/363,375, filed on Apr. 21, 2022, entitled "UPLINK SKIPPING AND UPLINK CONTROL INFORMATION MULTIPLEXING," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for uplink skipping and uplink control information multiplexing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

Some wireless communication networks have been deployed to provide extended reality (XR) services. XR refers to a spectrum of technologies, such as virtual reality (VR), augmented reality (AR), or mixed reality (MR), among other examples, that allow a communication system to provide data associated with providing digital content in an immersive and/or natural way. 5G networks and beyond can provide faster and more reliable connectivity, enabling low latency and high bandwidth applications, such as XR communications. XR devices may refer to communications devices that are deployed in a wireless communication network to provide XR data. For example, an XR device may be a type of UE or another type of device. Pose information is a type of information that can include real-time tracking of a position or orientation of an XR device or a user thereof, to enable XR data to be rendered. XR devices may generate or determine pose information using sensors, such as cameras, accelerometers, or gyroscopes, among other examples, and processing pose information using complex algorithms to ensure accuracy and responsiveness. In some scenarios, an XR device or a UE associated therewith may transmit pose information, on an uplink, to a network node for processing. For example, the XR device or the UE may transmit sensor data, from which the pose information can be derived, or pose information itself. The network node may, for example, select data to transmit on a downlink based at least in part on the pose information. For example, when an XR device is determined to be in a particular orientation based at least in part on pose information, the network node may transmit XR data that is to be rendered for the particular orientation (e.g., AR data that is to be overlaid on an image or view of the particular orientation).

SUMMARY

Some aspects described herein relate to a method of wireless communication performed by a user equipment (UE). The method may include receiving information identifying a set of uplink resources for a set of uplink transmissions. The method may include transmitting a subset of the set of uplink transmissions, wherein the subset of the set of uplink transmissions includes uplink control information multiplexed from a remainder of the set of uplink transmissions corresponding to one or more instances in which data is not available for transmission.

Some aspects described herein relate to a method of wireless communication performed by a network entity. The method may include transmitting information identifying a set of uplink resources for a set of uplink transmissions. The method may include receiving a subset of the set of uplink transmissions, wherein the subset of the set of uplink transmissions includes uplink control information multiplexed from a remainder of the set of uplink transmissions corresponding to one or more instances in which data is not available for transmission.

Some aspects described herein relate to a UE for wireless communication. The user equipment may include a memory and one or more processors coupled to the memory. The one or more processors may be configured to receive information identifying a set of uplink resources for a set of uplink transmissions. The one or more processors may be configured to transmit a subset of the set of uplink transmissions, wherein the subset of the set of uplink transmissions includes uplink control information multiplexed from a remainder of the set of uplink transmissions corresponding to one or more instances in which data is not available for transmission.

Some aspects described herein relate to a network entity for wireless communication. The network entity may include a memory and one or more processors coupled to the memory. The one or more processors may be configured to transmit information identifying a set of uplink resources for a set of uplink transmissions. The one or more processors may be configured to receive a subset of the set of uplink transmissions, wherein the subset of the set of uplink transmissions includes uplink control information multiplexed from a remainder of the set of uplink transmissions corresponding to one or more instances in which data is not available for transmission.

Some aspects described herein relate to a non-transitory computer-readable medium that stores a set of instructions for wireless communication by a UE. The set of instructions, when executed by one or more processors of the UE, may cause the UE to receive information identifying a set of uplink resources for a set of uplink transmissions. The set of instructions, when executed by one or more processors of the UE, may cause the UE to transmit a subset of the set of uplink transmissions, wherein the subset of the set of uplink transmissions includes uplink control information multiplexed from a remainder of the set of uplink transmissions corresponding to one or more instances in which data is not available for transmission.

Some aspects described herein relate to a non-transitory computer-readable medium that stores a set of instructions for wireless communication by a network entity. The set of instructions, when executed by one or more processors of the network entity, may cause the network entity to transmit information identifying a set of uplink resources for a set of uplink transmissions. The set of instructions, when executed by one or more processors of the network entity, may cause the network entity to receive a subset of the set of uplink transmissions, wherein the subset of the set of uplink transmissions includes uplink control information multiplexed from a remainder of the set of uplink transmissions corresponding to one or more instances in which data is not available for transmission.

Some aspects described herein relate to an apparatus for wireless communication. The apparatus may include means for receiving information identifying a set of uplink resources for a set of uplink transmissions. The apparatus may include means for transmitting a subset of the set of uplink transmissions, wherein the subset of the set of uplink transmissions includes uplink control information multiplexed from a remainder of the set of uplink transmissions corresponding to one or more instances in which data is not available for transmission.

Some aspects described herein relate to an apparatus for wireless communication. The apparatus may include means for transmitting information identifying a set of uplink resources for a set of uplink transmissions. The apparatus may include means for receiving a subset of the set of uplink transmissions, wherein the subset of the set of uplink transmissions includes uplink control information multiplexed from a remainder of the set of uplink transmissions corresponding to one or more instances in which data is not available for transmission.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A-5H are diagrams illustrating examples associated with uplink skipping and uplink control information multiplexing, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
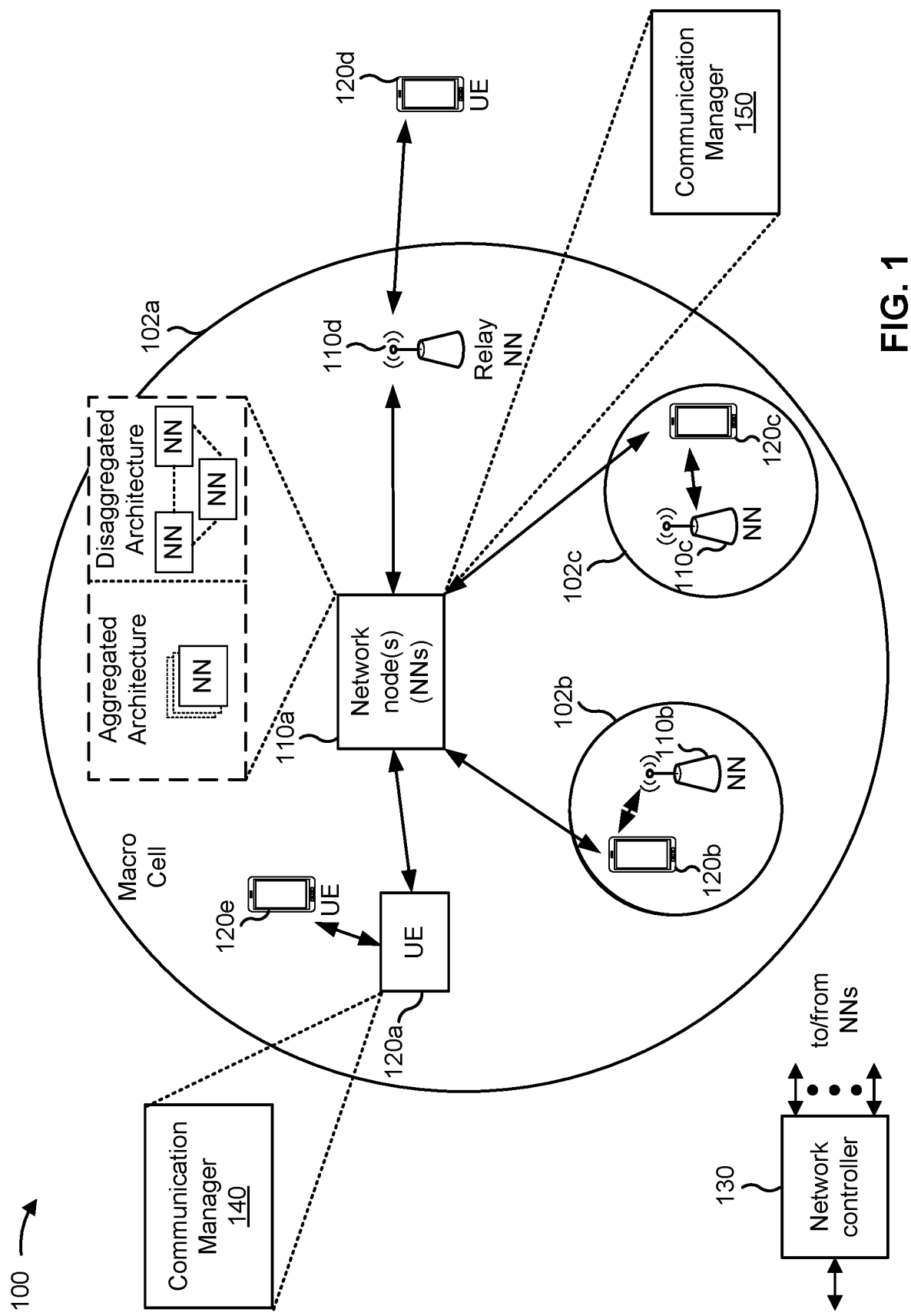
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive information identifying a set of uplink resources for a set of uplink transmissions; and transmit a subset of the set of uplink transmissions, wherein the subset of the set of uplink transmissions includes uplink control information multiplexed from a remainder of the set of uplink transmissions corresponding to one or more instances in which data is not available for transmission. Additionally, or alternatively, the communication manager 140 may perform one or more other operations described herein.

In some aspects, a network entity (e.g., the network node 110) may include a communication manager 150. As described in more detail elsewhere herein, the communication manager 150 may transmit information identifying a set of uplink resources for a set of uplink transmissions; and receive a subset of the set of uplink transmissions, wherein the subset of the set of uplink transmissions includes uplink control information multiplexed from a remainder of the set of uplink transmissions corresponding to one or more instances in which data is not available for transmission. Additionally, or alternatively, the communication manager 150 may perform one or more other operations described herein.

As indicated above, FIG. 1 is provided as an example. Other examples may differ from what is described with regard to FIG. 1.

Figure 2:
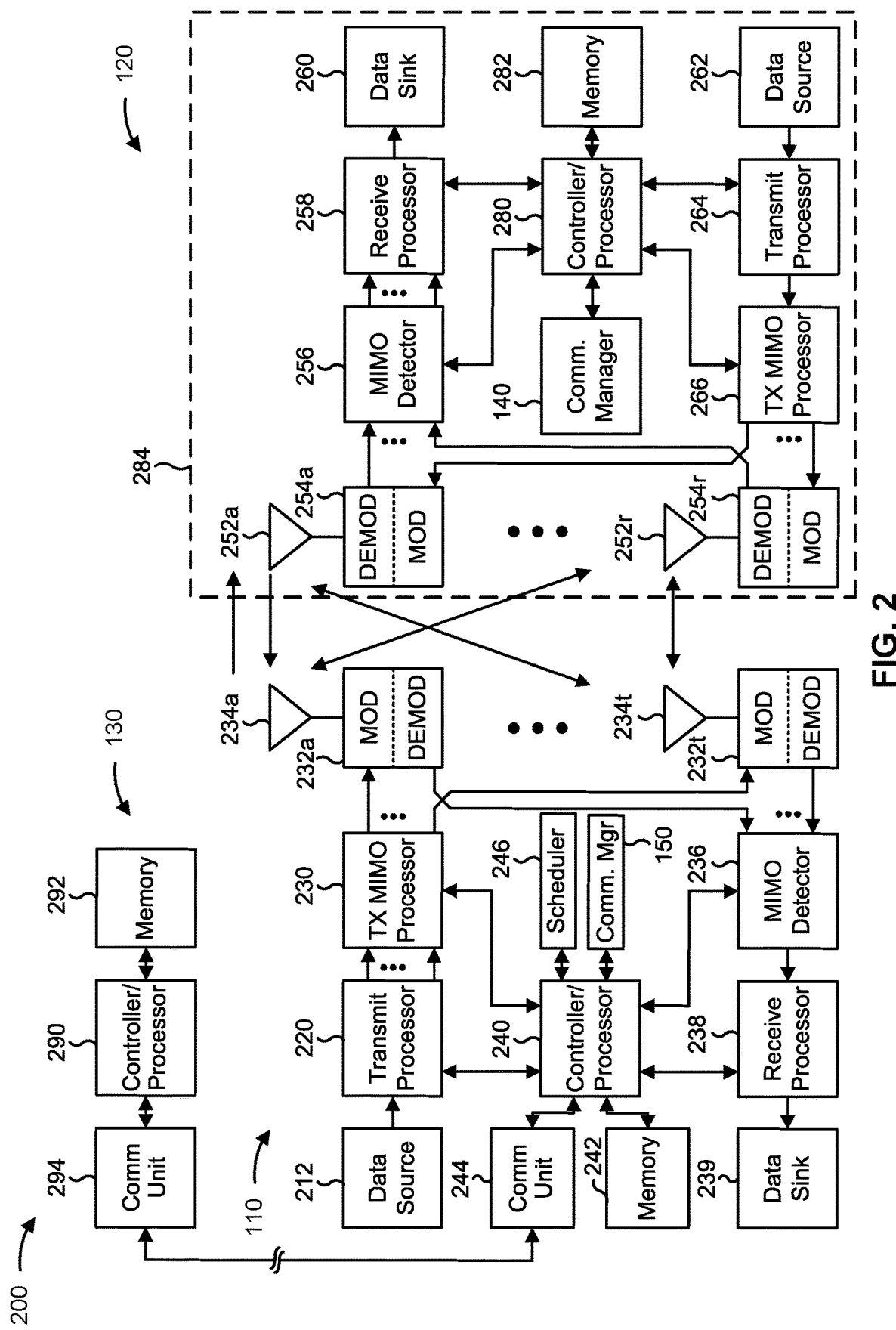
FIG. 2 is a diagram illustrating an example of a base station in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5A-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5A-9).

The controller/processor 240 of the network node 110, the controller/processor 280 of the UE 120, and/or any other component(s) of FIG. 2 may perform one or more techniques associated with uplink skipping and uplink control information multiplexing, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for receiving information identifying a set of uplink resources for a set of uplink transmissions; and/or means for transmitting a subset of the set of uplink transmissions, wherein the subset of the set of uplink transmissions includes uplink control information multiplexed from a remainder of the set of uplink transmissions corresponding to one or more instances in which data is not available for transmission. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., the network node 110) includes means for transmitting information identifying a set of uplink resources for a set of uplink transmissions; and/or means for receiving a subset of the set of uplink transmissions, wherein the subset of the set of uplink transmissions includes uplink control information multiplexed from a remainder of the set of uplink transmissions corresponding to one or more instances in which data is not available for transmission. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
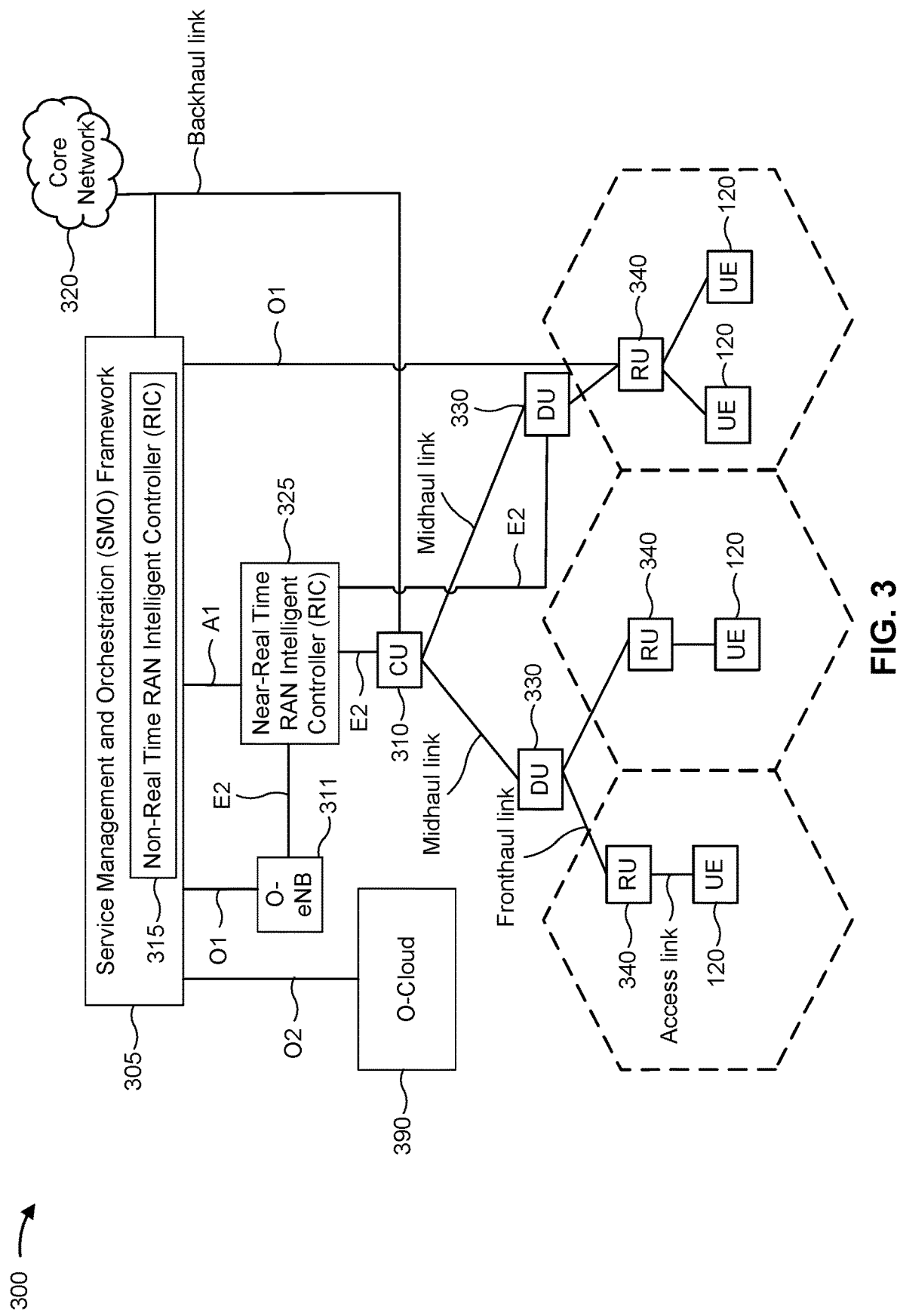
FIG. 3 is a diagram illustrating an example of an open radio access network (O-RAN) architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
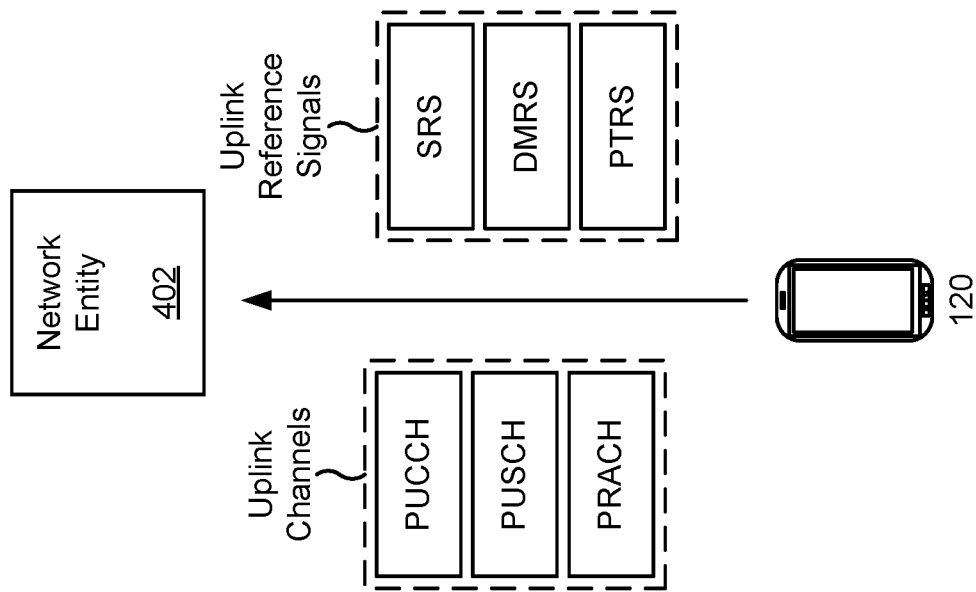
FIG. 4 is a diagram illustrating an example of physical channels and reference signals in a wireless network, in accordance with the present disclosure.
Figure 4:
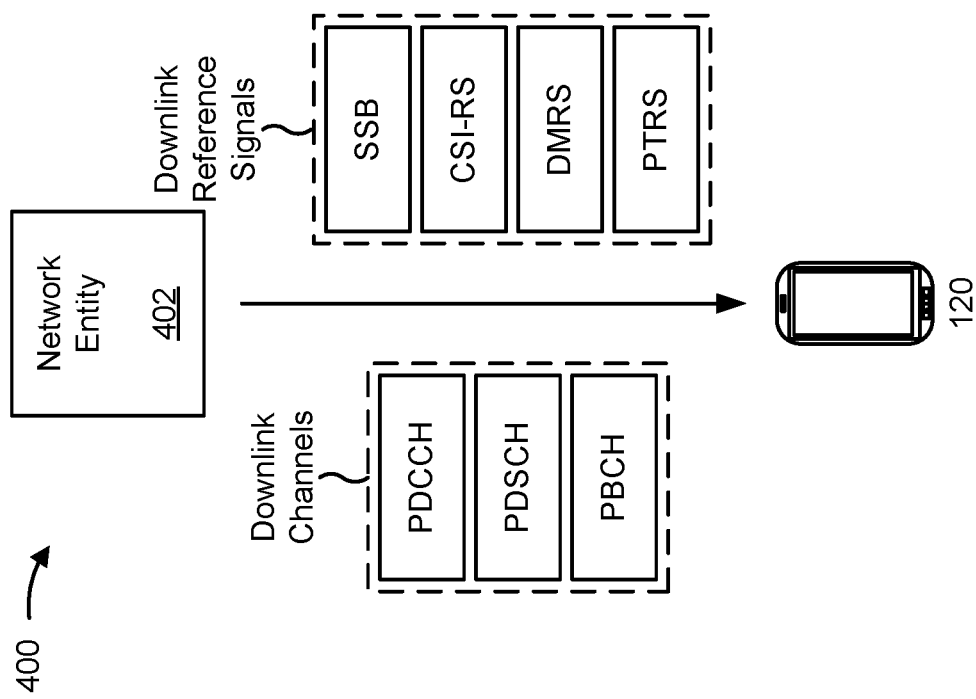

FIG. 4 is a diagram illustrating an example 400 of physical channels and reference signals in a wireless network, in accordance with the present disclosure. As shown in FIG. 4, downlink channels and downlink reference signals may carry information from a network entity 402 (e.g., which may correspond to the network node 110, the CU 310, the DU 330, or the RU 340, among other examples) to a UE 120, and uplink channels and uplink reference signals may carry information from a UE 120 to a network entity 402.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a PRACH used for initial network access, among other examples. The UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. The network entity 402 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The network entity 402 may configure a set of CSI-RSs for the UE 120, and the UE 120 may measure the configured set of CSI-RSs. Based at least in part on the measurements, the UE 120 may perform channel estimation and may report channel estimation parameters to the network entity 402 (e.g., in a CSI report), such as a CQI, a precoding matrix indicator (PMI), a CSI-RS resource indicator (CRI), a layer indicator (LI), a rank indicator (RI), or an RSRP, among other examples. The network entity 402 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the network entity 402 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. The network entity 402 may then calculate a position of the UE 120 based on the RSTD measurements reported by the UE 120.

An SRS may carry information used for uplink channel estimation, which may be used for scheduling, link adaptation, precoder selection, or beam management, among other examples. The network entity 402 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The network entity 402 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

In some communications systems, a UE may receive periodic resources, such as configured grant (CG) resources, to transmit periodically generated data to a network entity. For example, in extended reality (XR) or virtual reality (VR) scenarios, a UE may generate pose information at a particular rate (e.g., 500 hertz (Hz) and transmit the pose information (e.g., a rotation parameter value or a translation parameter value) to a network entity to enable the network entity to determine XR or VR data to provide to the UE. In some intervals for periodic transmission, a UE may not have data to transmit to the network entity. For example, in the XR or VR scenarios, pose information at a first instance may be the same as pose information at a second instance. In other words, between a first time and a second time, a UE may not be subject to a rotational movement or a translational movement, so the UE may not have an update to previously provided pose information. Accordingly, a UE may skip transmission of duplicative data in a periodic transmission scenario when the UE does not have data to transmit to the network entity. For example, in the XR or VR scenarios, the UE may forgo transmission of pose information that would be duplicative of previous pose information, thereby reducing a utilization of network resources.

As described above, a UE may transmit UCI to a network entity to provide control information to the network entity. In licensed spectrum operation, when the UE has generated PUSCH data for transmission to the network entity, the UE may multiplex the UCI onto the PUSCH. In contrast, when the UE does not have PUSCH data for transmission to the network entity, the UE may drop the PUSCH and transmit the UCI on a PUCCH. In unlicensed spectrum operation, the UE can multiplex configured grant UCI and hybrid automatic repeat request (HARQ) feedback (e.g., a HARQ-ACK) onto a PUSCH. Alternatively, without a configured grant, the UE may drop the PUSCH and transmit the HARQ feedback on a PUCCH. Additional details regarding PUCCH and PUSCH transmission are described with regard to 3GPP Technical Specification (TS) 38.300, Release 17, Version 17.0.0 and 3GPP TS 38.214, Release 17, Version 17.1.0.

However, when the UE skips a periodic uplink transmission, the network entity may not have information indicating the skip of the periodic uplink transmission. As a result, the network entity may attempt to receive the periodic uplink transmission rather than reusing network resources of the periodic uplink transmission for other purposes. Thus, some aspects described herein enable transmission of a skip indicator to indicate that a UE is skipping transmission of a periodic uplink transmission. Moreover, some aspects described herein provide UCI multiplexing in cases where a periodic uplink transmission is to be skipped in accordance with a skip indicator. In this way, the UE enables the network entity to reallocate unused network resources that had been allocated for a periodic uplink transmission, which is being skipped, thereby improving a utilization of network resources.

Figure 5B:
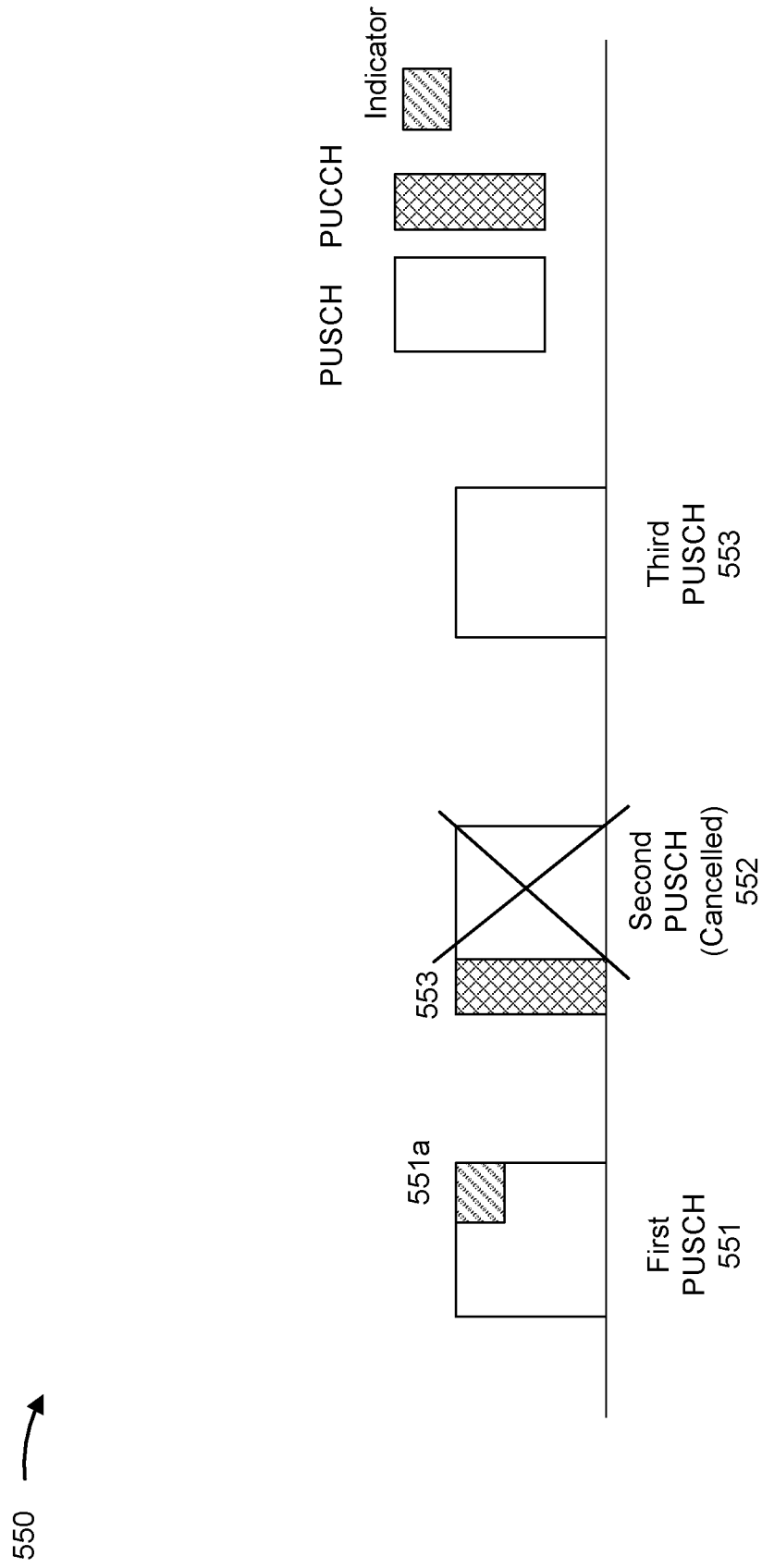

FIGS. 5A-5H are diagrams illustrating an example 500 associated with uplink skipping and uplink control information multiplexing, in accordance with the present disclosure. As shown in FIG. 5A, example 500 includes communication between a UE 120 and a network entity 502 (e.g., which may correspond to the network node 110, a CU 310, a DU 330, an RU 340, or a network entity 402, among other examples).

As further shown in FIG. 5A, and by reference number 510, the UE 120 may receive, from the network entity 502, scheduling information for a set of uplink transmissions. For example, the UE 120 may receive (e.g., using communication manager 140 and/or receive processor 238) a set of grants for periodic transmissions on a PUSCH and/or a PUCCH.

As further shown in FIG. 5A, and by reference numbers 520 and 530, in some aspects, the UE 120 may transmit, to the network entity 502, a skip indicator and may transmit a subset of the set of uplink transmissions. For example, the UE 120 may transmit (e.g., using communication manager 140 and/or transmit processor 220) an indication that the UE 120 is to skip at least one of the set of uplink transmissions on the PUSCH or the PUCCH and may then skip the indicated transmission. A "skip indicator" may be referred to as an "indicator" or a "successfully received indicator" or an "uplink control information (UCI) skipping indication" and a missed skip indicator may be referred to as a "lost indicator", in some aspects.

In some aspects, the UE 120 may transmit some other information, other than a skip indicator, from which the network entity 502 may infer that an uplink skip is to occur. For example, the UE 120 may use a particular type of identifier or tune to a particular channel or bandwidth part, and the network entity 502 may determine that the uplink skip is to occur when the UE 120 uses the particular type of identifier or tunes to the particular channel. Additionally, or alternatively, the UE 120 may transmit a response message or forgo transmitting a response message in a manner that the network entity 502 is configured to interpret as indicating that the uplink skip is to occur. Additionally, or alternatively, the network entity 502 may infer that the uplink skip is to occur based at least in part on a data rate or data volume over a particular period of time.

In some aspects, the UE 120 may convey the skip indicator in a MAC control element (CE). For example, the UE 120 may generate a MAC CE that includes a logical channel identifier (e.g., identifying a channel or instance thereof being skipped), a skip length (e.g., how much of a channel is being skipped), a skip duration (e.g., a quantity of instances of a channel being skipped), an indication of a resource for conveying UCI (e.g., a channel onto which UCI, which would have been on the channel being skipped, is to be multiplexed), or a carrier identifier (e.g., if skipping is configured for a multi-carrier communication scenario), among other examples.

In some aspects, the UE 120 may skip an uplink transmission on a PUSCH. For example, the UE 120 may skip an uplink transmission, on resources scheduled for PUSCH transmission, and may multiplex UCI, which was generated for inclusion with the PUSCH transmission, onto a PUCCH. In this case, as shown in FIG. 5B and an example 550, the UE 120 may transmit, in a first PUSCH 551, an indicator 551a that the UE 120 does not have data for transmission in a second, subsequent PUSCH 552. For example, the UE 120 may predict whether data will be generated for transmission in the second subsequent PUSCH 552 based at least in part on utilization of a particular application for which PUSCH data is generated. Based at least in part on predicting that data will not be generated for the second PUSCH 552, the UE 120 transmits the skip indicator 551a to enable the network entity 502 to release resources allocated for the second PUSCH 552 (e.g., for use for another communication).

In some aspects, the network entity 502 may attempt to blind decode UCI over a PUCCH 553 and UCI multiplexed on the PUSCH 552. For example, when the network entity 502 does not successfully receive the skip indicator 551a, the network entity 502 attempts to blind decode the UCI over the PUCCH 553 and UCI multiplexed on the PUSCH 552 to avoid missing detection of a PUCCH-only transmission. Alternatively, when the network entity 502 does not miss the skip indicator 551a, the network entity 502 may skip decoding of the second PUSCH 552, but may decode the third PUSCH 553. In this case, where PUSCHs 551-553 represent a set of PUSCH transmissions, the UE 120 only transmits a subset of the PUSCH transmissions (e.g., first PUSCH 551 and third PUSCH 553), thereby reducing a utilization of network resources. To avoid missing transmission of UCI, the UE 120 may multiplex UCI from a remainder of the set of PUSCH transmissions (e.g., the cancelled second PUSCH 552) onto one or more of the subset of PUSCH transmissions. In other words, the UE 120 may multiplex UCI, that was scheduled to be conveyed in the second PUSCH 552 (which was cancelled for lack of data for transmission), onto the first PUSCH 551 or the third PUSCH 553 (which are still transmitted for having data for transmission), to ensure that the UCI is still conveyed when the second PUSCH 552 is cancelled.

In some aspects, the network entity 502 and the UE 120 may use repetition of the skip indicator 551a, as described in more detail herein, or physical channel signaling, sequence-based signaling, or radio network temporary identifier (RNTI) based signaling (e.g., using MAC-CE signaling) to increase a reliability of the skip indicator. In this way, the network entity 502 and the UE 120 may reduce a likelihood of a missed skip indicator, thereby reducing a likelihood that the network entity 502 attempts blind decoding, which reduces utilization of power resources and a likelihood of data loss. As further shown in FIG. 5B, the UE 120 drops the second PUSCH 552, but the UE 120 transmits a PUSCH 553, which overlaps with the PUSCH 552, to convey a HARQ-ACK as there is no data for transmission in licensed operation and no configuration for unlicensed operation.

In another example, to increase reliability of a skip indicator, the network entity 502 may transmit a DCI in a PDCCH to acknowledge a skip indicator. In this case, if the network entity 502 does not acknowledge the skip indicator, the UE 120 may retransmit the skip indicator. Additionally, or alternatively, the UE 120 may use a wake up signal transmission (e.g., multiple wake up signal transmissions, sequence-based wake up signal transmissions, or channel-based wake-up signal transmissions) to convey a skip indicator. Additionally, or alternatively, the UE 120 may use a particular sequence, such as a particular DMRS signature, to convey a skip indicator. Additionally, or alternatively, the UE 120 may transmit a resource modification information (RMI) transmission to convey a skip indicator (e.g., to identify a resource in which an uplink transmission is not to occur). For example, the UE 120 may transmit the RMI to indicate that the UE 120 is to skip an uplink transmission or to indicate one or more other uplink transmissions that the UE 120 is to transmit (e.g., from which the network entity 502 can derive the uplink transmission being skipped), among other examples.

Figure 5C:
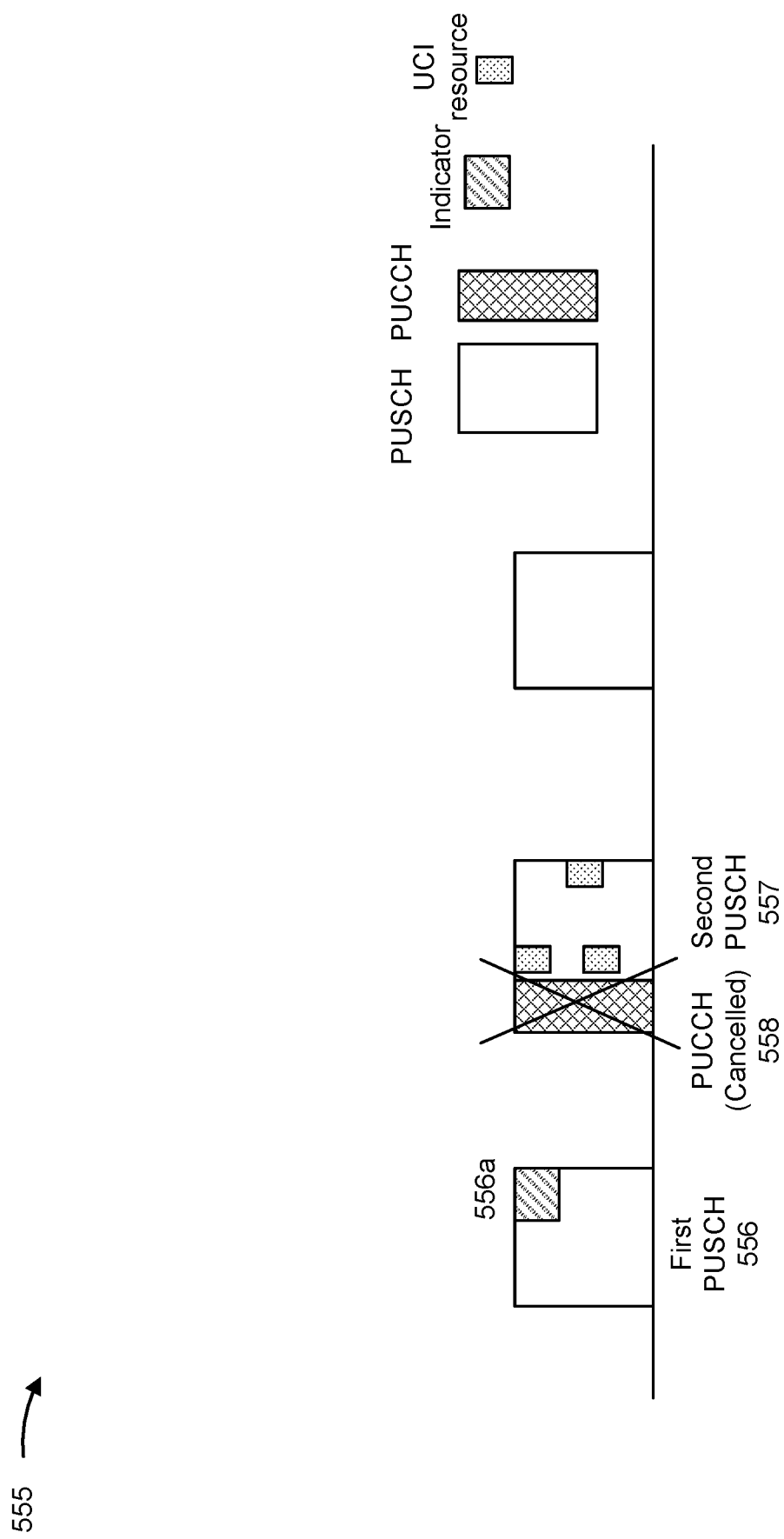
Figure 5D:
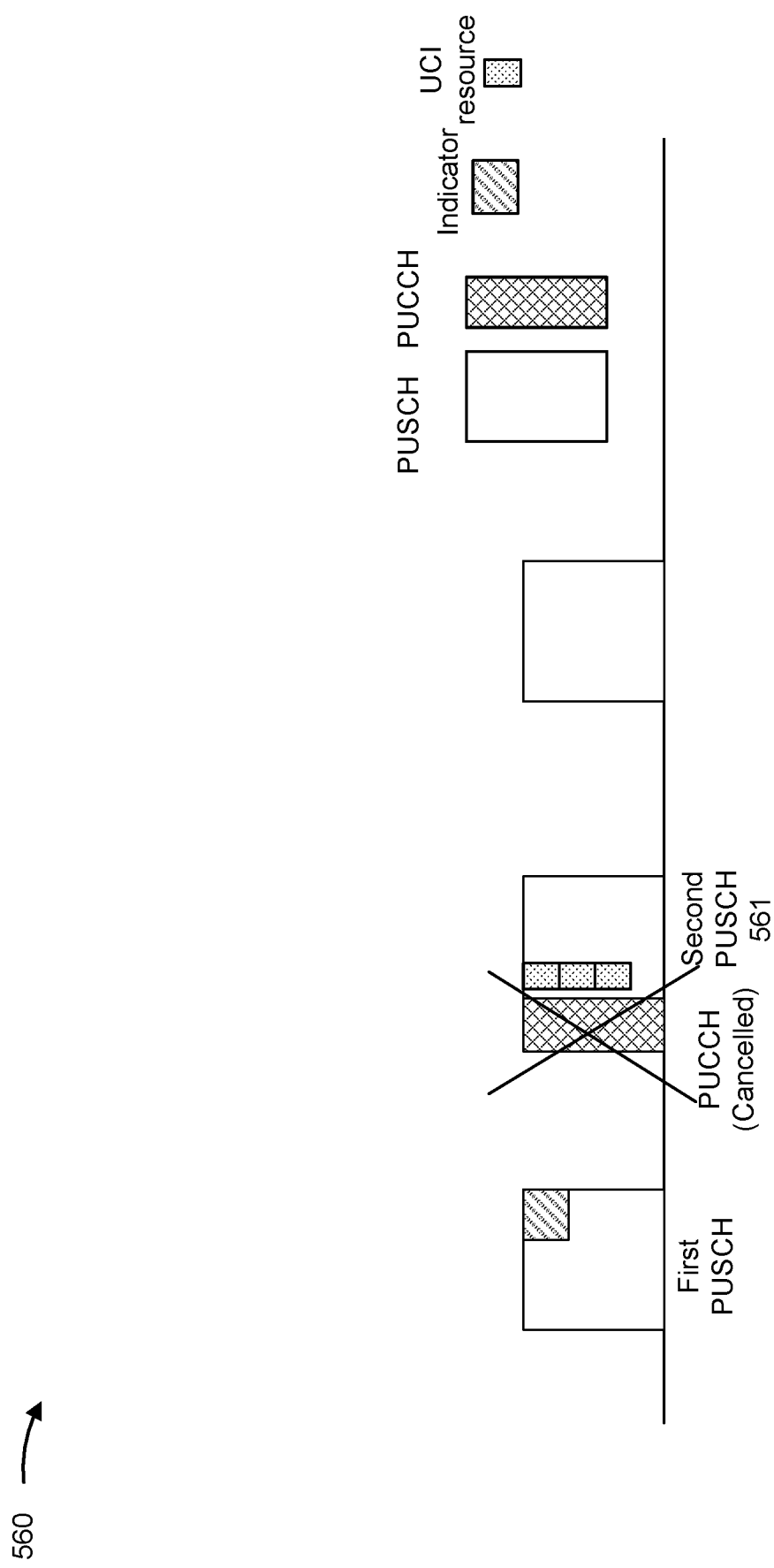

In some aspects, the UE 120 may skip an uplink transmission on a PUCCH. For example, the UE 120 may skip an uplink transmission, on resources scheduled for a PUCCH transmission, and may multiplex UCI, which was generated for inclusion with the PUCCH transmission, onto a PUSCH. In this case, as shown in FIG. 5C and by example 555, the UE 120 transmits a skip indicator 556a in a first PUSCH 556, skips transmission of a PUCCH 558, and transmits a second PUSCH 557, which at least partially overlaps with the skipped PUCCH 558. The UE 120 may multiplex the UCI onto UCI resources of the PUSCH 557, as shown. To perform UCI multiplexing, PUSCH resources are punctured or rate matched; however, without data for transmission, filler bits can be used, which may result in an inefficient utilization of network resources. Alternatively, the UCI can be restricted to a subset of resources, however, some resource blocks of an orthogonal frequency division multiplexing (OFDM) symbol may not be transmitted in such a case. Accordingly, as shown in FIG. 5D and an example 560, the UE 120 may multiplex the UCI onto a first N symbols or a last N symbols of the PUSCH 561, where N is a quantity of symbols used to convey the UCI. In this case, by selecting contiguous symbols, the UE 120 avoids an inefficient use of network resources relating to using padding bits and a communication interruption relating to restricting the UCI to disjoint subsets of bits.

Figure 5E:
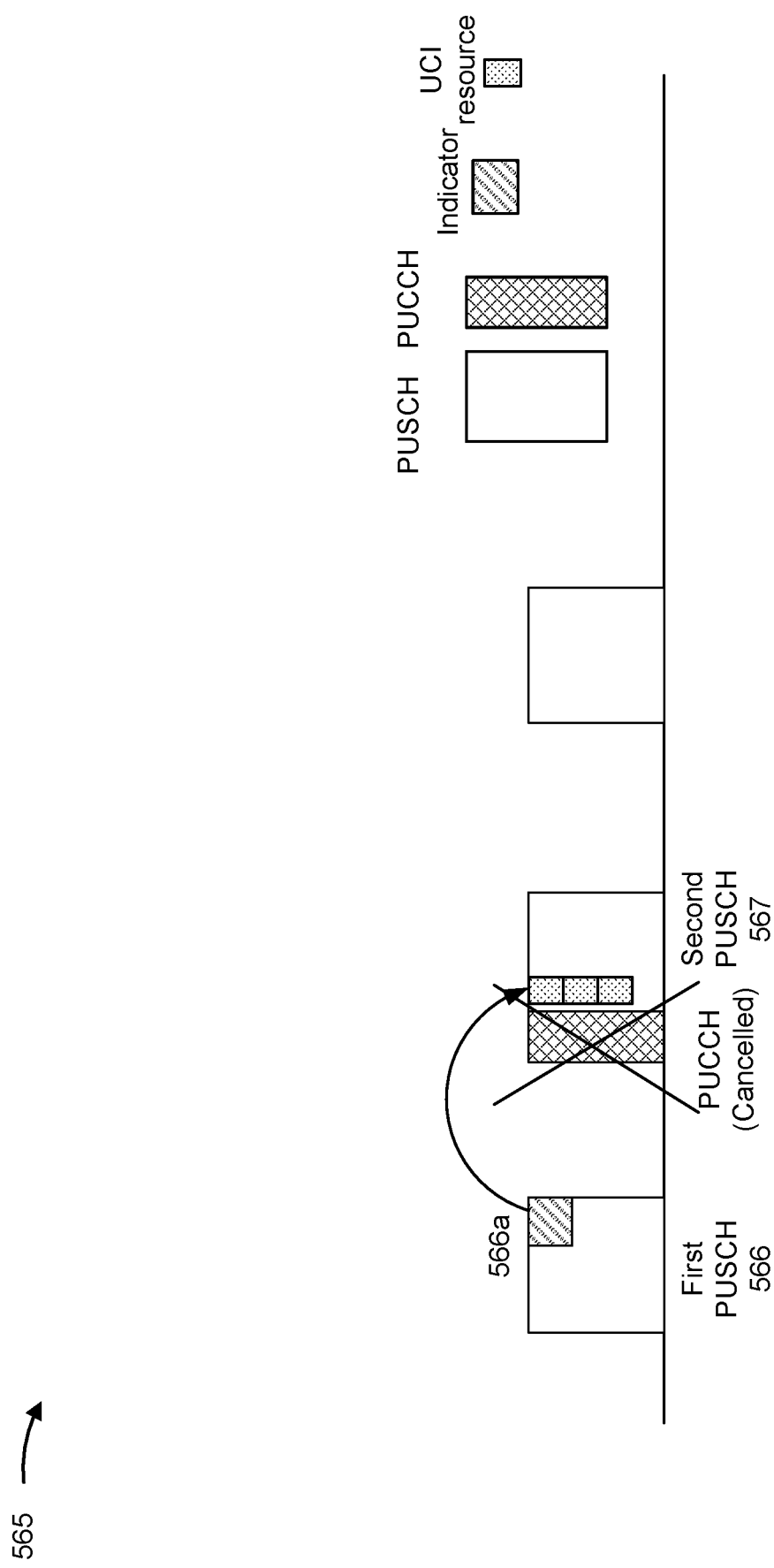

In some aspects, the UE 120 may transmit a UCI skipping indication. For example, as shown in FIG. 5E and an example 565, when the UE 120 does not have PUSCH data in a buffer, the UE 120 may transmit, in a first PUSCH 566, a skip indicator 566a that indicates that a second PUSCH 567 includes resources for a UCI ACK/NACK and not resources for other PUSCH data. In this case, the network entity 502 can reuse other resources of the PUSCH 567.

In some aspects, the UE 120 may indicate, in a skip indicator, such as the UCI skipping indication, which resources of a subsequent PUSCH will be used to transmit UCI. In some aspects, the UE 120 may transmit a skip indicator based at least in part on whether a PUCCH and a PUSCH overlap. For example, the UE 120 may determine that there is no data for transmission and may transmit a skip indicator for a PUSCH. However, when the PUSCH and a PUCCH overlap, the UE 120 may forgo transmitting the skip indicator. In this case, when a skip indicator is not received (e.g., based at least in part on the UE 120 forgoing transmission thereof), the network entity 502 may use one or more specified rules to determine whether to detect the PUCCH only or to detect the PUCCH and UCI multiplexed on a PUSCH.

Figure 5F:
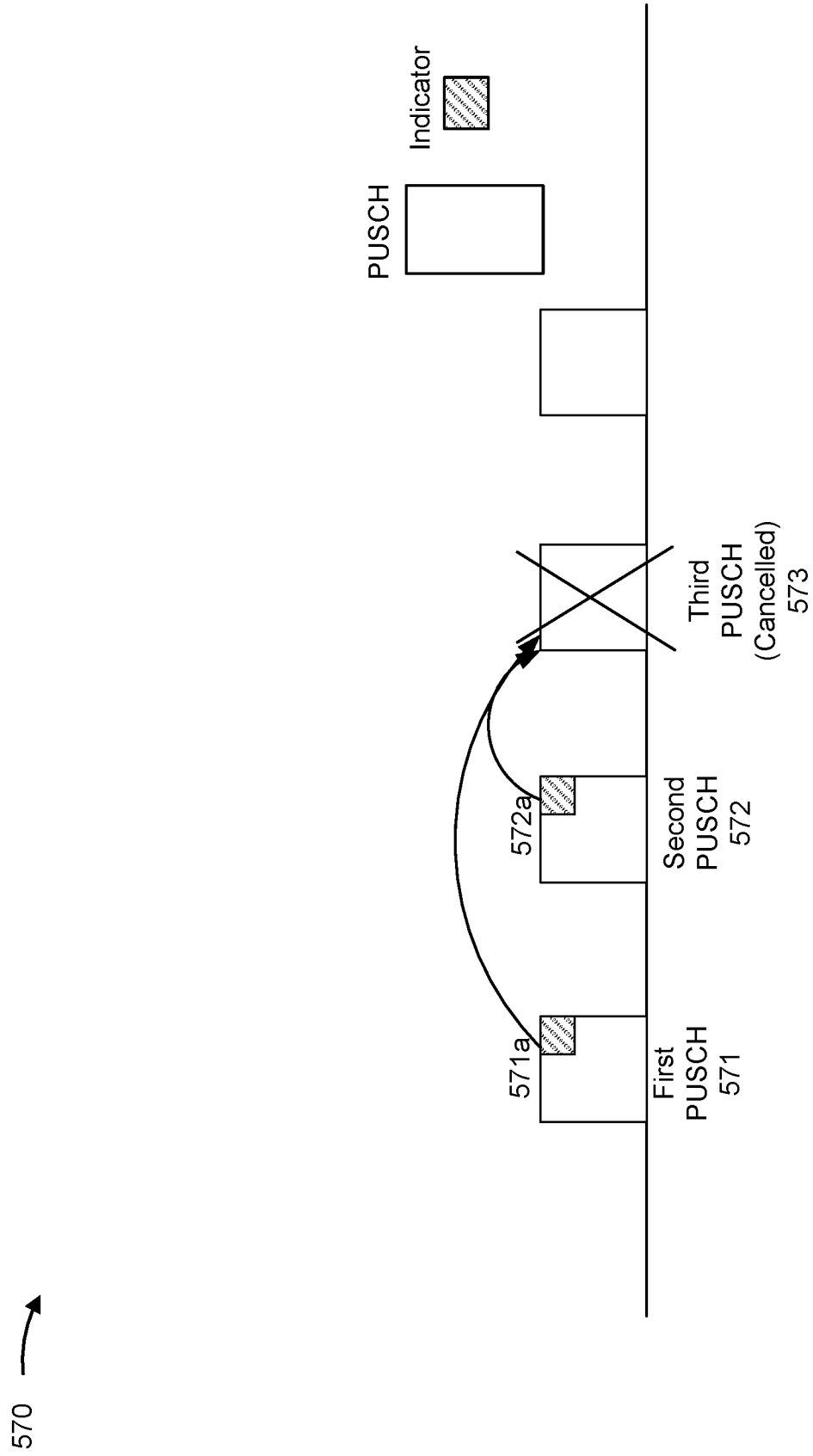

In some aspects, the UE 120 may repeat transmission of a skip indicator. For example, as shown in FIG. 5F and an example 570, the UE 120 may transmit a skip indicator 571a in a first PUSCH 571 and a repetition of the skip indicator (show as skip indicator 572a) in a second PUSCH 572 to indicate that the UE 120 is to skip transmission of a third PUSCH 573. In this case, each transmission of the skip indicator 571a/572a may be referred to as a "repetition" of the skip indicator 571a/572a. In other words, the UE 120 may transmit a first instance or repetition of the skip indicator 571a in the first PUSCH 571 and a second instance or repetition of the skip indicator 572a in the second PUSCH 572. In this way, the UE 120 increases a likelihood that the network entity 502 successfully receives the skip indicator 571a/572a and can reallocate resources of the third PUSCH 573.

Figure 5G:
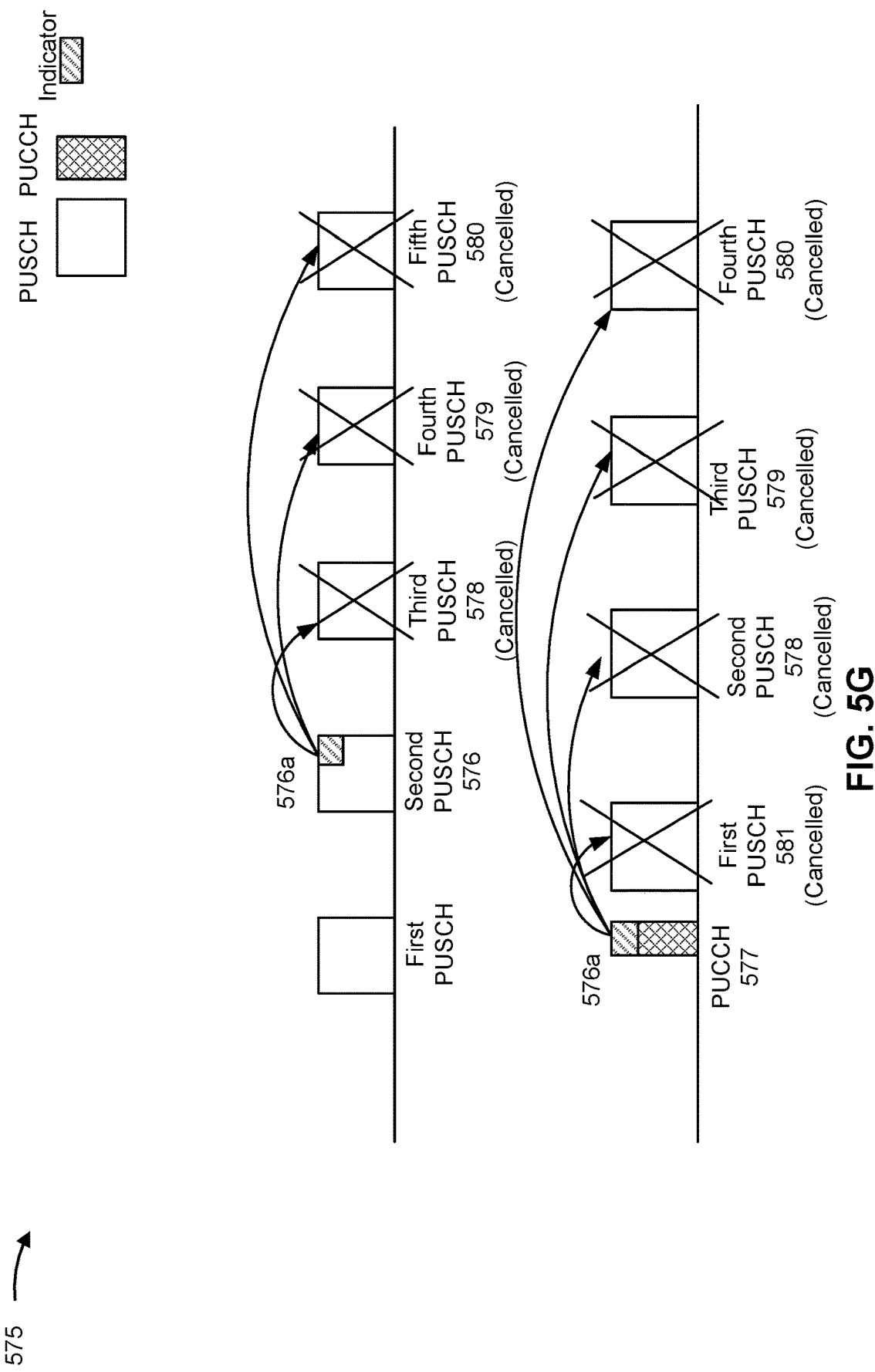

In some aspects, the UE 120 may transmit a skip indicator to convey information for a plurality of PUSCHs. For example, as shown in FIG. 5G and an example 575, the UE 120 may transmit a skip indicator 576a in a second PUSCH 576 or in a PUCCH 577 to indicate that the UE 120 is to skip a plurality of subsequent PUSCH transmissions (e.g., PUSCHs 578, 579, 580, and/or 581). In this case, the UE 120 may include bits in the skip indicator 576a to indicate each of the plurality of PUSCH transmissions 578-581 that are to be skipped. In this way, the UE 120 may reduce a resource utilization relative to transmitting a skip indicator for each skipped PUSCH. In some aspects, the UE 120 may transmit multiple repetitions of a skip indicator that indicates that the UE 120 is to skip a plurality of subsequent PUSCH transmissions. For example, the UE 120 may transmit a first repetition of a skip indicator in a first PUSCH and a second repetition of the skip indicator in a second PUSCH to indicate that the UE 120 is skipping a third PUSCH and a fourth PUSCH.

Figure 5H:
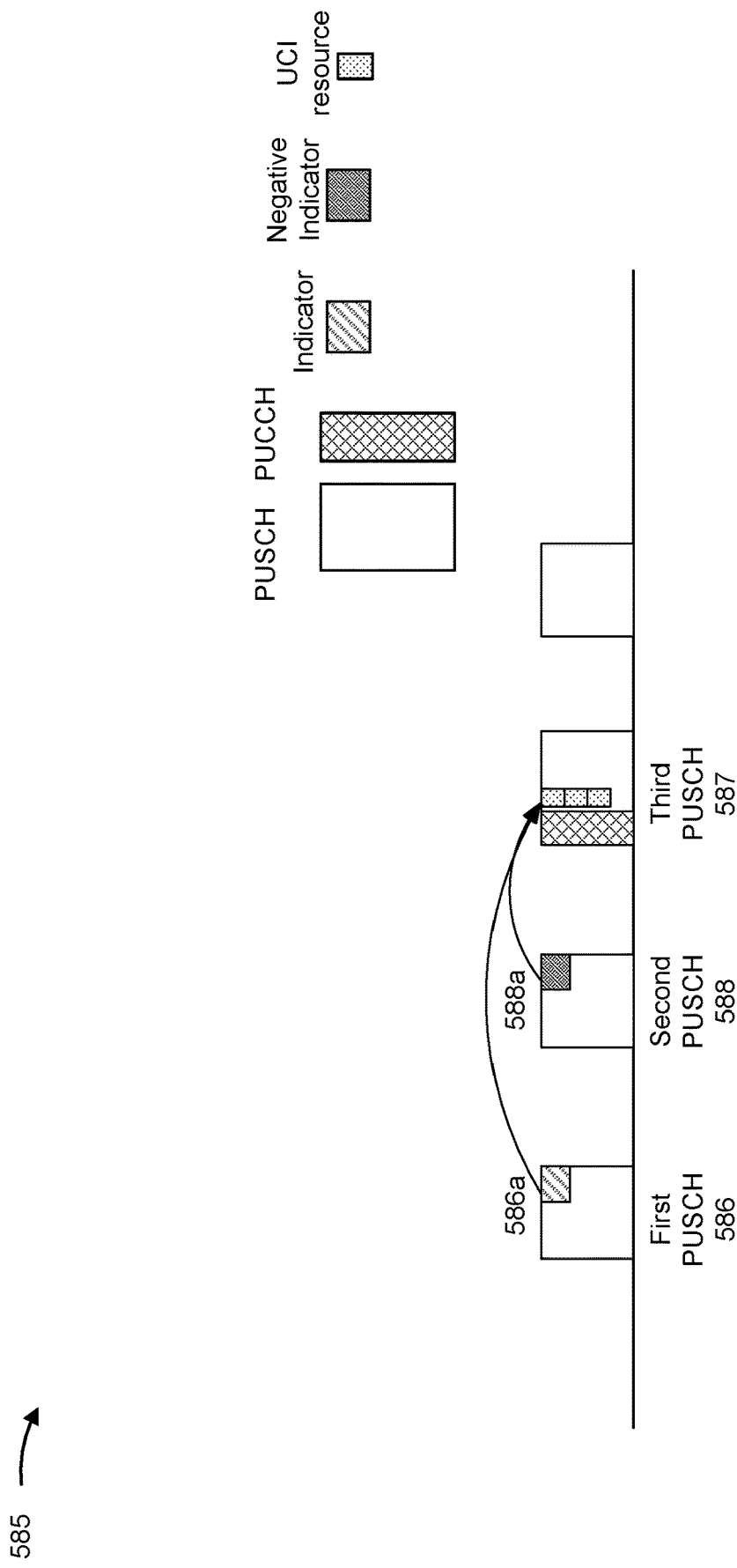

In some aspects, the UE 120 may transmit a cancellation of a skip indicator. For example, as shown in FIG. 5H and an example 585, the UE 120 may transmit a skip indicator 586a in a first PUSCH 586 to indicate that the UE 120 is to skip a third PUSCH 587. In this case, the UE 120 may determine, after transmitting the skip indicator 586a, that the UE 120 does have data for transmission in the third PUSCH 587 and may transmit a negative skip indication 588a in a second PUSCH 588 to indicate that the UE 120 will not skip the third PUSCH 587. In this case, the network entity 502 can monitor for the third PUSCH 587 based at least in part on receiving the negative skip indication 588a. A cancellation of a skip indicator can be referred to as a "negative skip indication" or a "cancellation indication."

As indicated above, FIGS. 5A-5H are provided as an example. Other examples may differ from what is described with respect to FIGS. 5A-5H.

Figure 6:
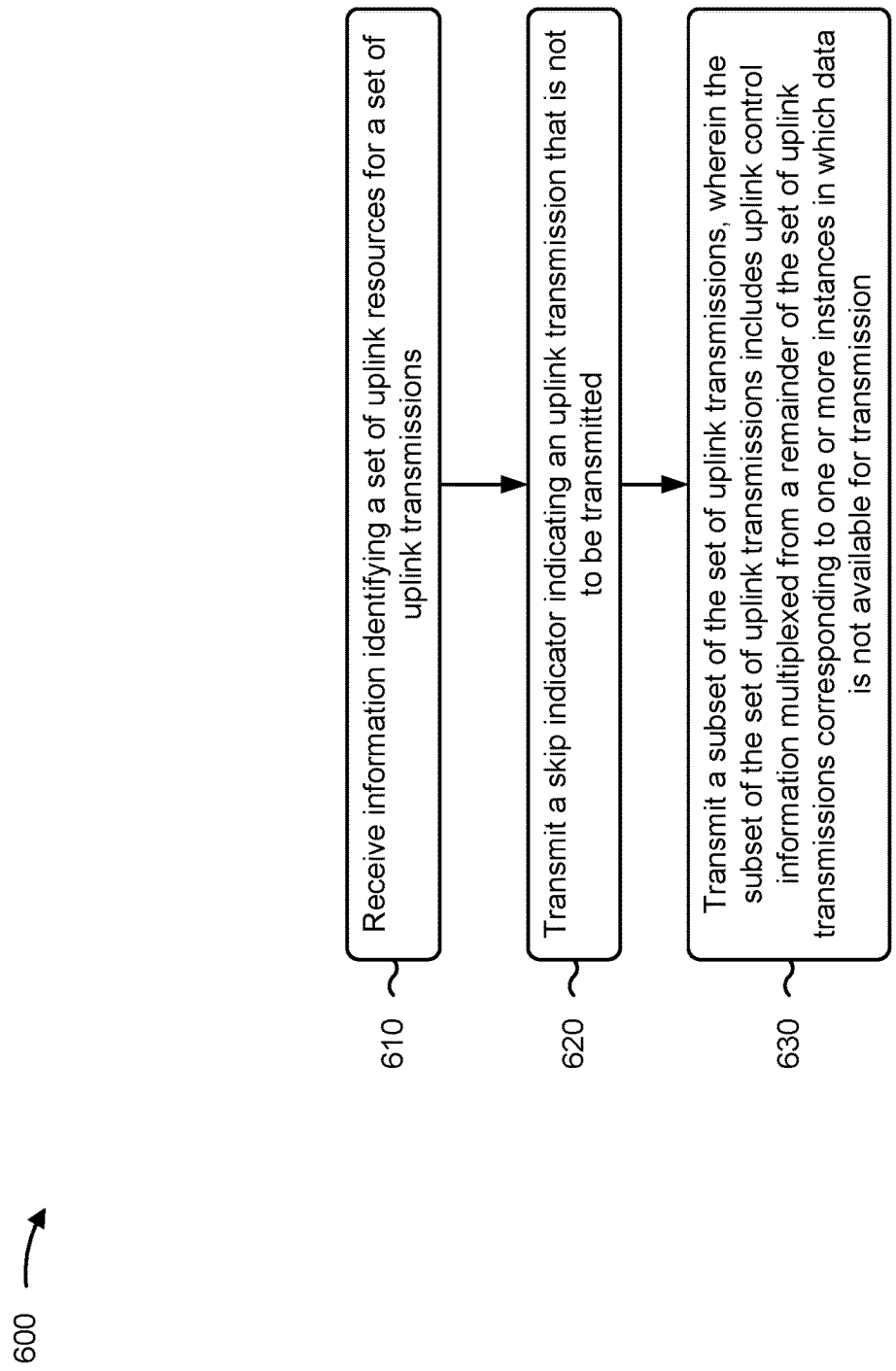
FIGS. 6-7 are diagrams illustrating example processes associated with uplink skipping and uplink control information multiplexing, in accordance with the present disclosure.

FIG. 6 is a diagram illustrating an example process 600 performed, for example, by a UE, in accordance with the present disclosure. Example process 600 is an example where the UE (e.g., UE 120) performs operations associated with uplink skipping and uplink control information multiplexing.

As shown in FIG. 6, in some aspects, process 600 may include receiving information identifying a set of uplink resources for a set of uplink transmissions (block 610). For example, the UE (e.g., using communication manager 140 and/or reception component 802, depicted in FIG. 8) may receive information identifying a set of uplink resources for a set of uplink transmissions, as described above.

As shown in FIG. 6, in some aspects, process 600 may include transmitting a skip indicator indicating an uplink transmission that is not to be transmitted (block 620). For example, the UE (e.g., using communication manager 140 and/or transmission component 804, depicted in FIG. 8) may transmit the skip indicator, as described above.

As further shown in FIG. 6, in some aspects, process 600 may include transmitting a subset of the set of uplink transmissions, wherein the subset of the set of uplink transmissions includes uplink control information multiplexed from a remainder of the set of uplink transmissions corresponding to one or more instances in which data is not available for transmission (block 630). For example, the UE (e.g., using communication manager 140 and/or transmission component 804, depicted in FIG. 8) may transmit a subset of the set of uplink transmissions, wherein the subset of the set of uplink transmissions includes uplink control information multiplexed from a remainder of the set of uplink transmissions corresponding to one or more instances in which data is not available for transmission, as described above.

Process 600 may include additional aspects, such as any single aspect or any combination of aspects described below and/or in connection with one or more other processes described elsewhere herein.

In a first aspect, process 600 includes identifying a resource, of the set of uplink resources, in which an uplink transmission, of the remainder of the set of uplink transmissions, is not to occur, and transmitting RMI identifying the resource in which the uplink transmission is not to occur. In a second aspect, alone or in combination with the first aspect, transmitting the RMI identifying the resource comprises transmitting the RMI identifying the resource in an uplink transmission of the subset of the set of uplink transmissions or in a wake up signal. In a third aspect, alone or in combination with one or more of the first and second aspects, the subset of the set of uplink transmissions includes a physical uplink control channel transmission and a skipped uplink transmission of the remainder of the set of uplink transmissions includes a physical uplink shared channel transmission associated with the physical uplink control channel transmission.

In a fourth aspect, alone or in combination with one or more of the first through third aspects, process 600 includes transmitting a hybrid automatic repeat request feedback message that overlaps with the physical uplink shared channel in a resource, of the set of resources, allocated for the physical uplink shared channel. In a fifth aspect, alone or in combination with one or more of the first through fourth aspects, the uplink control information, associated with the physical uplink shared channel transmission and the associated physical uplink control channel transmission, is blind decodable. In a sixth aspect, alone or in combination with one or more of the first through fifth aspects, process 600 includes transmitting an indicator of a skipped uplink transmission of the remainder of the set of uplink transmissions in connection with at least one of a sequence based message, a radio network temporary identifier based message, one or more other skipped uplink transmissions of the remainder of the set of uplink transmissions, or one or more repetitions of the indicator.

In a seventh aspect, alone or in combination with one or more of the first through sixth aspects, the uplink control information of a skipped uplink transmission of the remainder of the set of uplink transmissions is multiplexed onto an uplink transmission of the subset of the set of uplink transmissions. In an eighth aspect, alone or in combination with one or more of the first through seventh aspects, the uplink control information is a set of contiguous symbols on a first quantity of symbols or a last quantity of symbols of the uplink transmission of the subset of the set of uplink transmissions. In a ninth aspect, alone or in combination with one or more of the first through eighth aspects, hybrid automatic repeat request feedback of a skipped uplink transmission of the remainder of the set of uplink transmissions is multiplexed onto an uplink transmission of the subset of the set of uplink transmissions.

In a tenth aspect, alone or in combination with one or more of the first through ninth aspects, process 600 includes transmitting a skip indicator for the remainder of the set of uplink transmissions, based at least in part on whether a physical uplink control channel and a physical uplink shared channel overlap in a resource, of the set of uplink resources, allocated for the remainder of the set of uplink transmissions. In an eleventh aspect, alone or in combination with one or more of the first through tenth aspects, process 600 includes transmitting a skip indicator for an uplink transmission, of the set of uplink transmissions, and transmitting, after transmitting the skip indicator, a cancellation of the skip indicator for the uplink transmission. In a twelfth aspect, alone or in combination with one or more of the first through eleventh aspects, process 600 includes transmitting a skip indicator using a particular message, wherein the particular message is a MAC CE, downlink control information, a wake up signal, or a sequence based indicator, and wherein the particular message is associated with at least one of a bit sequence, a skip indication, a skip length, a skip duration, an identification of a skipped uplink transmission, an identification of a resource for uplink control information multiplexing, or a carrier identifier. In a thirteenth aspect, alone or in combination with one or more of the first through twelfth aspects, the data is one or more values for a pose parameter identifying at least one of a rotational position or a translational position of the UE or a component associated therewith.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
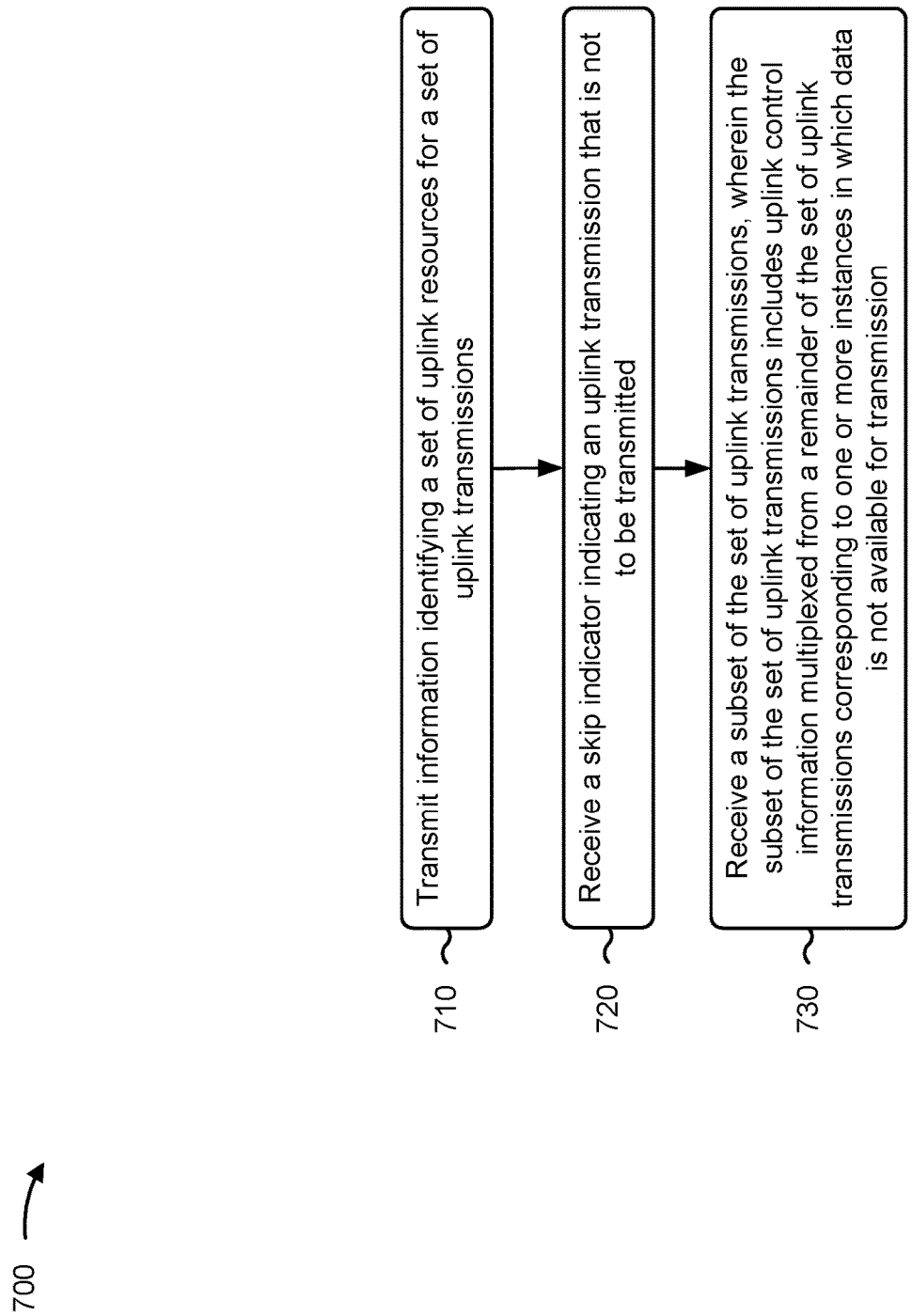

FIG. 7 is a diagram illustrating an example process 700 performed, for example, by a network entity, in accordance with the present disclosure. Example process 700 is an example where the network entity (e.g., network node 110, CU 310, DU 330, RU 340, network entity 402, or network entity 502, among other examples) performs operations associated with uplink skipping and uplink control information multiplexing.

As shown in FIG. 7, in some aspects, process 700 may include transmitting information identifying a set of uplink resources for a set of uplink transmissions (block 710). For example, the network entity (e.g., using communication manager 150 and/or transmission component 904, depicted in FIG. 9) may transmit information identifying a set of uplink resources for a set of uplink transmissions, as described above.

As shown in FIG. 7, in some aspects, process 700 may include receiving a skip indicator indicating an uplink transmission that is not to be transmitted (block 720). For example, the network entity (e.g., using communication manager 140 and/or reception component 902, depicted in FIG. 9) may receive the skip indicator, as described above.

As further shown in FIG. 7, in some aspects, process 700 may include receiving a subset of the set of uplink transmissions, wherein the subset of the set of uplink transmissions includes uplink control information multiplexed from a remainder of the set of uplink transmissions corresponding to one or more instances in which data is not available for transmission (block 730). For example, the network entity (e.g., using communication manager 150 and/or reception component 902, depicted in FIG. 9) may receive a subset of the set of uplink transmissions, wherein the subset of the set of uplink transmissions includes uplink control information multiplexed from a remainder of the set of uplink transmissions corresponding to one or more instances in which data is not available for transmission, as described above.

Process 700 may include additional aspects, such as any single aspect or any combination of aspects described below and/or in connection with one or more other processes described elsewhere herein.

In a first aspect, process 700 includes receiving RMI identifying a resource, of the set of uplink resources, in which an uplink transmission, of the remainder of the set of uplink transmissions, is not to occur. In a second aspect, alone or in combination with the first aspect, receiving the RMI identifying the resource comprises receiving the RMI identifying the resource in an uplink transmission of the subset of the set of uplink transmissions or in a wake up signal. In a third aspect, alone or in combination with one or more of the first and second aspects, the subset of the set of uplink transmissions includes a physical uplink control channel transmission and a skipped uplink transmission of the remainder of the set of uplink transmissions includes a physical uplink shared channel transmission associated with the physical uplink control channel transmission. In a fourth aspect, alone or in combination with one or more of the first through third aspects, process 700 includes receiving a hybrid automatic repeat request feedback message that overlaps with the physical uplink shared channel in a resource, of the set of resources, allocated for the physical uplink shared channel.

In a fifth aspect, alone or in combination with one or more of the first through fourth aspects, the uplink control information, associated with the physical uplink shared channel transmission and the associated physical uplink control channel transmission, is blind decodable. In a sixth aspect, alone or in combination with one or more of the first through fifth aspects, process 700 includes receiving an indicator of a skipped uplink transmission of the remainder of the set of uplink transmissions in connection with at least one of a sequence based message, a radio network temporary identifier based message, one or more other skipped uplink transmissions of the remainder of the set of uplink transmissions, or one or more repetitions of the indicator. In a seventh aspect, alone or in combination with one or more of the first through sixth aspects, the uplink control information of a skipped uplink transmission of the remainder of the set of uplink transmissions is multiplexed onto an uplink transmission of the subset of the set of uplink transmissions. In an eighth aspect, alone or in combination with one or more of the first through seventh aspects, the uplink control information is a set of contiguous symbols on a first quantity of symbols or a last quantity of symbols of the uplink transmission of the subset of the set of uplink transmissions.

In a ninth aspect, alone or in combination with one or more of the first through eighth aspects, hybrid automatic repeat request feedback of a skipped uplink transmission of the remainder of the set of uplink transmissions is multiplexed onto an uplink transmission of the subset of the set of uplink transmissions. In a tenth aspect, alone or in combination with one or more of the first through ninth aspects, process 700 includes receiving a skip indicator for the remainder of the set of uplink transmissions, based at least in part on whether a physical uplink control channel and a physical uplink shared channel overlap in a resource, of the set of uplink resources, allocated for the remainder of the set of uplink transmissions. In an eleventh aspect, alone or in combination with one or more of the first through tenth aspects, process 700 includes receiving a skip indicator for an uplink transmission, of the set of uplink transmissions, and receiving, after transmitting the skip indicator, a cancellation of the skip indicator for the uplink transmission. In a twelfth aspect, alone or in combination with one or more of the first through eleventh aspects, process 700 includes receiving a skip indicator using a particular message, wherein the particular message is a MAC-CE, downlink control information, a wake up signal, or a sequence based indicator, and wherein the particular message is associated with at least one of a bit sequence, a skip indication, a skip length, a skip duration, an identification of a skipped uplink transmission, an identification of a resource for uplink control information multiplexing, or a carrier identifier. In a thirteenth aspect, alone or in combination with one or more of the first through twelfth aspects, the data is one or more values for a pose parameter identifying at least one of a rotational position or a translational position.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
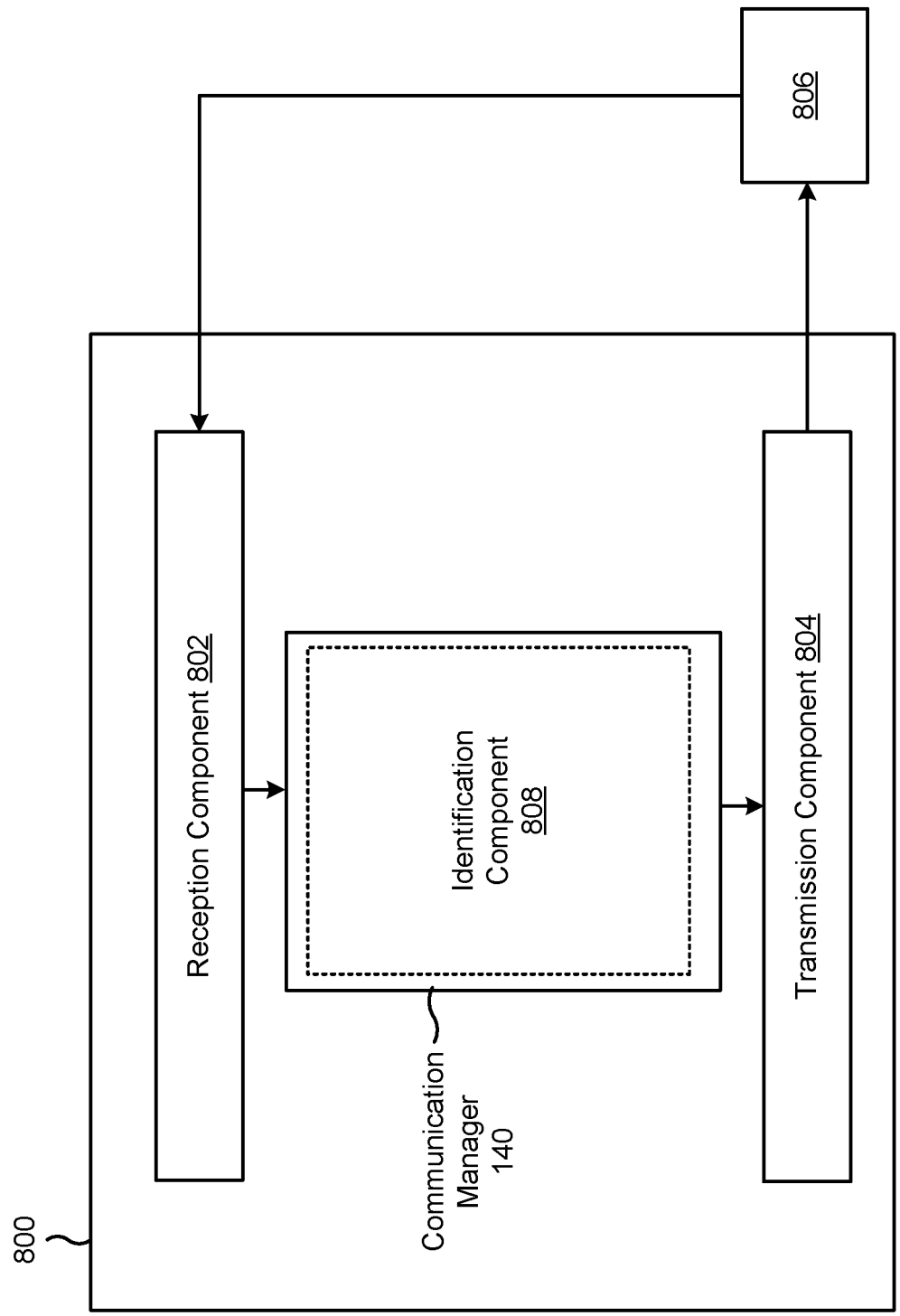
FIGS. 8-9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a network node, or another wireless communication device) using the reception component 802 and the transmission component 804. As further shown, the apparatus 800 may include the communication manager 140. The communication manager 140 may include an identification component 808, among other examples.

In some aspects, the apparatus 800 may be configured to perform one or more operations described herein in connection with FIGS. 5A-5H. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive information identifying a set of uplink resources for a set of uplink transmissions. The transmission component 804 may transmit a subset of the set of uplink transmissions, wherein the subset of the set of uplink transmissions includes uplink control information multiplexed from a remainder of the set of uplink transmissions corresponding to one or more instances in which data is not available for transmission.

The identification component 808 may identify a resource, of the set of uplink resources, in which an uplink transmission, of the remainder of the set of uplink transmissions, is not to occur. The transmission component 804 may transmit RMI identifying the resource in which the uplink transmission is not to occur. The transmission component 804 may transmit a hybrid automatic repeat request feedback message that overlaps with the physical uplink shared channel in a resource, of the set of resources, allocated for the physical uplink shared channel. The transmission component 804 may transmit an indicator of a skipped uplink transmission of the remainder of the set of uplink transmissions in connection with at least one of a sequence based message, a radio network temporary identifier based message, one or more other skipped uplink transmissions of the remainder of the set of uplink transmissions, or one or more repetitions of the indicator.

The transmission component 804 may transmit a skip indicator for the remainder of the set of uplink transmissions, based at least in part on whether a physical uplink control channel and a physical uplink shared channel overlap in a resource, of the set of uplink resources, allocated for the remainder of the set of uplink transmissions.

The transmission component 804 may transmit a skip indicator for an uplink transmission, of the set of uplink transmissions. The transmission component 804 may transmit, after transmitting the skip indicator, a cancellation of the skip indicator for the uplink transmission. The transmission component 804 may transmit a skip indicator using a particular message, wherein the particular message is a MAC CE, downlink control information, a wake up signal, or a sequence based indicator.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
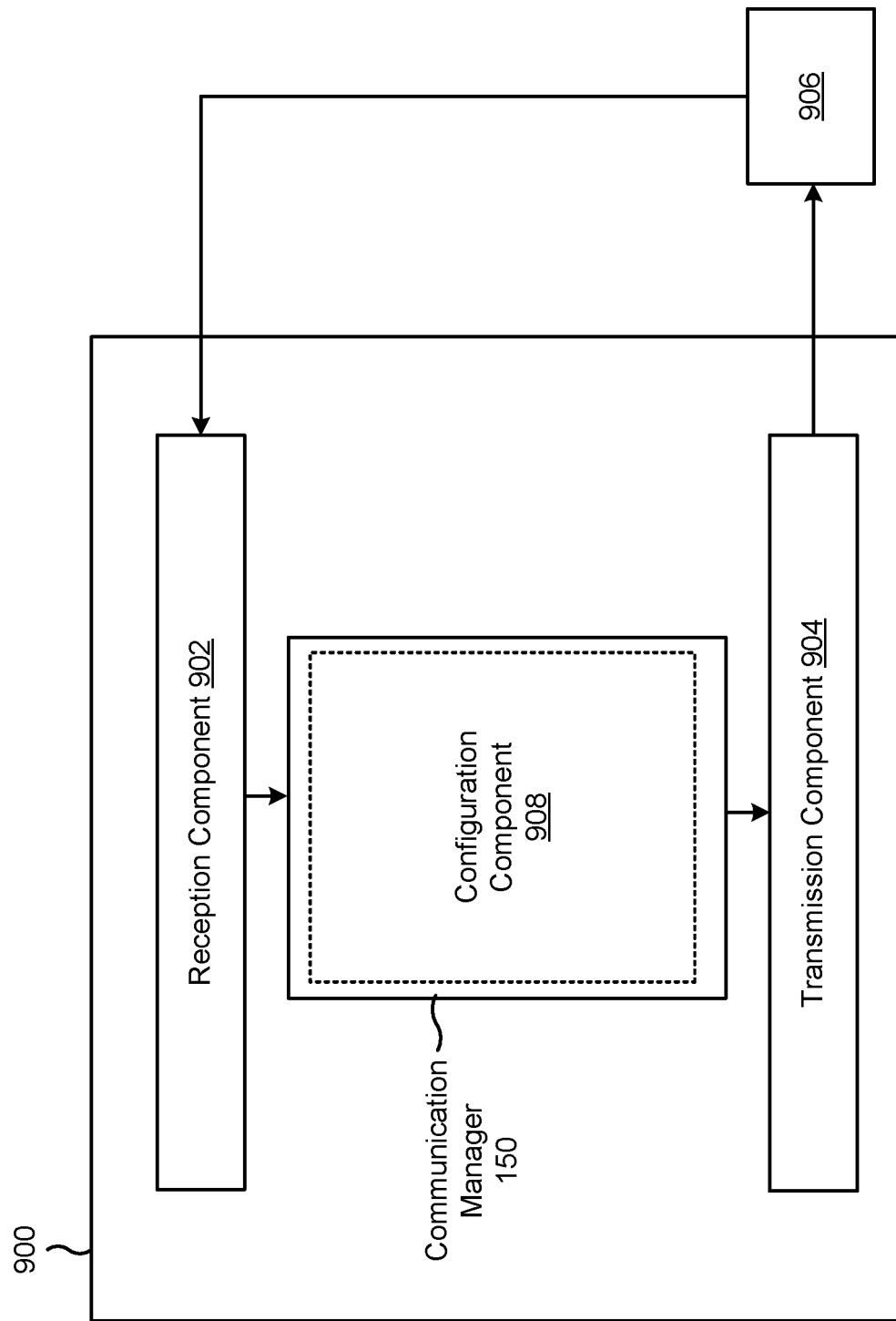

FIG. 9 is a diagram of an example apparatus 900 for wireless communication. The apparatus 900 may be a network entity, or a network entity may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a network node, or another wireless communication device) using the reception component 902 and the transmission component 904. As further shown, the apparatus 900 may include the communication manager 150. The communication manager 150 may include a configuration component 908, among other examples.

In some aspects, the apparatus 900 may be configured to perform one or more operations described herein in connection with FIGS. 5A-5H. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network entity described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network entity described in connection with FIG. 2. In some aspects, the transmission component 904 may be co-located with the reception component 902 in a transceiver.

The transmission component 904 may transmit information identifying a set of uplink resources for a set of uplink transmissions. The reception component 902 may receive a subset of the set of uplink transmissions, wherein the subset of the set of uplink transmissions includes uplink control information multiplexed from a remainder of the set of uplink transmissions corresponding to one or more instances in which data is not available for transmission. The configuration component 908 may configure resources for the set of uplink transmissions. The reception component 902 may receive RMI identifying a resource, of the set of uplink resources, in which an uplink transmission, of the remainder of the set of uplink transmissions, is not to occur. The reception component 902 may receive a hybrid automatic repeat request feedback message that overlaps with the physical uplink shared channel in a resource, of the set of resources, allocated for the physical uplink shared channel.

The reception component 902 may receive an indicator of a skipped uplink transmission of the remainder of the set of uplink transmissions in connection with at least one of a sequence based message, a radio network temporary identifier based message, one or more other skipped uplink transmissions of the remainder of the set of uplink transmissions, or one or more repetitions of the indicator. The reception component 902 may receive a skip indicator for the remainder of the set of uplink transmissions, based at least in part on whether a physical uplink control channel and a physical uplink shared channel overlap in a resource, of the set of uplink resources, allocated for the remainder of the set of uplink transmissions. The reception component 902 may receive a skip indicator for an uplink transmission, of the set of uplink transmissions. The reception component 902 may receive, after transmitting the skip indicator, a cancellation of the skip indicator for the uplink transmission. The reception component 902 may receive a skip indicator using a particular message, wherein the particular message is a MAC-CE, downlink control information, a wake up signal, or a sequence based indicator.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving information identifying a set of uplink resources for a set of uplink transmissions; and transmitting a subset of the set of uplink transmissions, wherein the subset of the set of uplink transmissions includes uplink control information multiplexed from a remainder of the set of uplink transmissions corresponding to one or more instances in which data is not available for transmission.

Aspect 2: The method of Aspect 1, further comprising: identifying a resource, of the set of uplink resources, in which an uplink transmission, of the remainder of the set of uplink transmissions, is not to occur; and transmitting resource modification information (RMI) identifying the resource in which the uplink transmission is not to occur.

Aspect 3: The method of Aspect 2, wherein transmitting the RMI identifying the resource comprises: transmitting the RMI identifying the resource in an uplink transmission of the subset of the set of uplink transmissions or in a wake up signal.

Aspect 4: The method of any of Aspects 1 to 3, wherein the subset of the set of uplink transmissions includes a physical uplink control channel transmission and a skipped uplink transmission of the remainder of the set of uplink transmissions includes a physical uplink shared channel transmission associated with the physical uplink control channel transmission.

Aspect 5: The method of Aspect 4, further comprising: transmitting a hybrid automatic repeat request feedback message that overlaps with the physical uplink shared channel in a resource, of the set of resources, allocated for the physical uplink shared channel.

Aspect 6: The method of Aspect 4, wherein the uplink control information, associated with the physical uplink shared channel transmission and the associated physical uplink control channel transmission, is blind decodable.

Aspect 7: The method of any of Aspects 1 to 6, further comprising: transmitting an indicator of a skipped uplink transmission of the remainder of the set of uplink transmissions in connection with at least one of: a sequence based message, a radio network temporary identifier based message, one or more other skipped uplink transmissions of the remainder of the set of uplink transmissions, or one or more repetitions of the indicator.

Aspect 8: The method of any of Aspects 1 to 7, wherein the uplink control information of a skipped uplink transmission of the remainder of the set of uplink transmissions is multiplexed onto an uplink transmission of the subset of the set of uplink transmissions.

Aspect 9: The method of Aspect 8, wherein the uplink control information is a set of contiguous symbols on a first quantity of symbols or a last quantity of symbols of the uplink transmission of the subset of the set of uplink transmissions.

Aspect 10: The method of any of Aspects 1 to 9, wherein hybrid automatic repeat request feedback of a skipped uplink transmission of the remainder of the set of uplink transmissions is multiplexed onto an uplink transmission of the subset of the set of uplink transmissions.

Aspect 11: The method of any of Aspects 1 to 10, further comprising: transmitting a skip indicator for the remainder of the set of uplink transmissions, based at least in part on whether a physical uplink control channel and a physical uplink shared channel overlap in a resource, of the set of uplink resources, allocated for the remainder of the set of uplink transmissions.

Aspect 12: The method of any of Aspects 1 to 11, further comprising: transmitting a skip indicator for an uplink transmission, of the set of uplink transmissions; and transmitting, after transmitting the skip indicator, a cancellation of the skip indicator for the uplink transmission.

Aspect 13: The method of any of Aspects 1 to 12, further comprising: transmitting a skip indicator using a particular message, wherein the particular message is a medium access control (MAC) control element, downlink control information, a wake up signal, or a sequence based indicator, and wherein the particular message is associated with at least one of: a bit sequence, a skip indication, a skip length, a skip duration, an identification of a skipped uplink transmission, an identification of a resource for uplink control information multiplexing, or a carrier identifier.

Aspect 14: The method of Aspect 1, wherein the data is one or more values for a pose parameter identifying at least one of a rotational position or a translational position of the UE or a component associated therewith.

Aspect 15: A method of wireless communication performed by a network entity, comprising: transmitting information identifying a set of uplink resources for a set of uplink transmissions; and receiving a subset of the set of uplink transmissions, wherein the subset of the set of uplink transmissions includes uplink control information multiplexed from a remainder of the set of uplink transmissions corresponding to one or more instances in which data is not available for transmission.

Aspect 16: The method of Aspect 15, further comprising: receiving resource modification information (RMI) identifying a resource, of the set of uplink resources, in which an uplink transmission, of the remainder of the set of uplink transmissions, is not to occur.

Aspect 17: The method of Aspect 16, wherein receiving the RMI identifying the resource comprises: receiving the RMI identifying the resource in an uplink transmission of the subset of the set of uplink transmissions or in a wake up signal.

Aspect 18: The method of any of Aspects 15 to 17, wherein the subset of the set of uplink transmissions includes a physical uplink control channel transmission and a skipped uplink transmission of the remainder of the set of uplink transmissions includes a physical uplink shared channel transmission associated with the physical uplink control channel transmission.

Aspect 19: The method of Aspect 18, further comprising: receiving a hybrid automatic repeat request feedback message that overlaps with the physical uplink shared channel in a resource, of the set of resources, allocated for the physical uplink shared channel.

Aspect 20: The method of Aspect 18, wherein the uplink control information, associated with the physical uplink shared channel transmission and the associated physical uplink control channel transmission, is blind decodable.

Aspect 21: The method of any of Aspects 15 to 20, further comprising: receiving an indicator of a skipped uplink transmission of the remainder of the set of uplink transmissions in connection with at least one of: a sequence based message, a radio network temporary identifier based message, one or more other skipped uplink transmissions of the remainder of the set of uplink transmissions, or one or more repetitions of the indicator.

Aspect 22: The method of any of Aspects 15 to 21, wherein the uplink control information of a skipped uplink transmission of the remainder of the set of uplink transmissions is multiplexed onto an uplink transmission of the subset of the set of uplink transmissions.

Aspect 23: The method of Aspect 22, wherein the uplink control information is a set of contiguous symbols on a first quantity of symbols or a last quantity of symbols of the uplink transmission of the subset of the set of uplink transmissions.

Aspect 24: The method of any of Aspects 15 to 23, wherein hybrid automatic repeat request feedback of a skipped uplink transmission of the remainder of the set of uplink transmissions is multiplexed onto an uplink transmission of the subset of the set of uplink transmissions.

Aspect 25: The method of any of Aspects 15 to 24, further comprising: receiving a skip indicator for the remainder of the set of uplink transmissions, based at least in part on whether a physical uplink control channel and a physical uplink shared channel overlap in a resource, of the set of uplink resources, allocated for the remainder of the set of uplink transmissions.

Aspect 26: The method of any of Aspects 15 to 25, further comprising: receiving a skip indicator for an uplink transmission, of the set of uplink transmissions; and receiving, after transmitting the skip indicator, a cancellation of the skip indicator for the uplink transmission.

Aspect 27: The method of any of Aspects 15 to 26, further comprising: receiving a skip indicator using a particular message, wherein the particular message is a medium access control (MAC) control element, downlink control information, a wake up signal, or a sequence based indicator, and wherein the particular message is associated with at least one of: a bit sequence, a skip indication, a skip length, a skip duration, an identification of a skipped uplink transmission, an identification of a resource for uplink control information multiplexing, or a carrier identifier.

Aspect 28: The method of any of Aspects 15 to 27, wherein the data is one or more values for a pose parameter identifying at least one of a rotational position or a translational position.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving information identifying a set of uplink resources for a set of uplink transmissions;
   transmitting a subset of the set of uplink transmissions, wherein the subset of the set of uplink transmissions includes uplink control information multiplexed from a remainder of the set of uplink transmissions corresponding to one or more instances in which data is not available for transmission;
   identifying a resource, of the set of uplink resources, in which an uplink transmission, of the remainder of the set of uplink transmissions, is not to occur; and
   transmitting resource modification information (RMI) identifying the resource in which the uplink transmission is not to occur.

2. The method of claim 1, wherein transmitting the RMI identifying the resource comprises:
   transmitting the RMI identifying the resource in an uplink transmission of the subset of the set of uplink transmissions or in a wake up signal.

3. The method of claim 1, wherein the subset of the set of uplink transmissions includes a physical uplink control channel transmission and a skipped uplink transmission of the remainder of the set of uplink transmissions includes a physical uplink shared channel transmission associated with the physical uplink control channel transmission.

4. The method of claim 3, further comprising:
   transmitting a hybrid automatic repeat request feedback message that overlaps with the physical uplink shared channel in a resource, of the set of resources, allocated for the physical uplink shared channel.

5. The method of claim 3, wherein the uplink control information, associated with the physical uplink shared channel transmission and the associated physical uplink control channel transmission, is blind decodable.

6. The method of claim 1, wherein transmitting the RMI comprises transmitting an indicator of a skipped uplink transmission of the remainder of the set of uplink transmissions in connection with at least one of:
   a sequence based message,
   a radio network temporary identifier based message,
   one or more other skipped uplink transmissions of the remainder of the set of uplink transmissions, or
   one or more repetitions of the indicator.

7. The method of claim 1, wherein the uplink control information of a skipped uplink transmission of the remainder of the set of uplink transmissions is multiplexed onto an uplink transmission of the subset of the set of uplink transmissions.

8. The method of claim 7, wherein the uplink control information is a set of contiguous symbols on a first quantity of symbols or a last quantity of symbols of the uplink transmission of the subset of the set of uplink transmissions.

9. The method of claim 1, wherein hybrid automatic repeat request feedback of a skipped uplink transmission of the remainder of the set of uplink transmissions is multiplexed onto an uplink transmission of the subset of the set of uplink transmissions.

10. The method of claim 1, wherein transmitting the RMI comprises transmitting a skip indicator for the remainder of the set of uplink transmissions, and wherein identifying the resource comprises identifying based at least in part on whether a physical uplink control channel and a physical uplink shared channel overlap in a resource, of the set of uplink resources, allocated for the remainder of the set of uplink transmissions.

11. A method of wireless communication performed by a network entity, comprising:
   transmitting information identifying a set of uplink resources for a set of uplink transmissions;
   receiving a subset of the set of uplink transmissions, wherein the subset of the set of uplink transmissions includes uplink control information multiplexed from a remainder of the set of uplink transmissions corresponding to one or more instances in which data is not available for transmission; and
   receiving resource modification information (RMI) identifying a resource, of the set of uplink resources, in which an uplink transmission, of the remainder of the set of uplink transmissions, is not to occur.

12. The method of claim 11, wherein receiving the RMI identifying the resource comprises:
   receiving the RMI identifying the resource in an uplink transmission of the subset of the set of uplink transmissions or in a wake up signal.

13. The method of claim 11, wherein the subset of the set of uplink transmissions includes a physical uplink control channel transmission and a skipped uplink transmission of the remainder of the set of uplink transmissions includes a physical uplink shared channel transmission associated with the physical uplink control channel transmission.

14. The method of claim 13, further comprising:
   receiving a hybrid automatic repeat request feedback message that overlaps with the physical uplink shared channel in a resource, of the set of resources, allocated for the physical uplink shared channel.

15. The method of claim 13, wherein the uplink control information, associated with the physical uplink shared channel transmission and the associated physical uplink control channel transmission, is blind decodable.

16. The method of claim 11, wherein receiving the RMI comprises receiving an indicator of a skipped uplink transmission of the remainder of the set of uplink transmissions in connection with at least one of:
   a sequence based message,
   a radio network temporary identifier based message,
   one or more other skipped uplink transmissions of the remainder of the set of uplink transmissions, or
   one or more repetitions of the indicator.

17. The method of claim 11, wherein the uplink control information of a skipped uplink transmission of the remainder of the set of uplink transmissions is multiplexed onto an uplink transmission of the subset of the set of uplink transmissions.

18. The method of claim 17, wherein the uplink control information is a set of contiguous symbols on a first quantity of symbols or a last quantity of symbols of the uplink transmission of the subset of the set of uplink transmissions.

19. The method of claim 11, wherein hybrid automatic repeat request feedback of a skipped uplink transmission of the remainder of the set of uplink transmissions is multiplexed onto an uplink transmission of the subset of the set of uplink transmissions.

20. The method of claim 11, wherein receiving the RMI comprises receiving a skip indicator for the remainder of the set of uplink transmissions, based at least in part on whether a physical uplink control channel and a physical uplink shared channel overlap in a resource, of the set of uplink resources, allocated for the remainder of the set of uplink transmissions.

21. A user equipment (UE) for wireless communication, comprising:
   a memory; and
   one or more processors, coupled to the memory, configured to:
   receive information identifying a set of uplink resources for a set of uplink transmissions;
   transmit a subset of the set of uplink transmissions, wherein the subset of the set of uplink transmissions includes uplink control information multiplexed from a remainder of the set of uplink transmissions corresponding to one or more instances in which data is not available for transmission;
   identify a resource, of the set of uplink resources, in which an uplink transmission, of the remainder of the set of uplink transmissions, is not to occur; and
   transmit resource modification information (RMI) identifying the resource in which the uplink transmission is not to occur.

22. The UE of claim 21, wherein the RMI comprises a skip indicator for the uplink transmission, of the set of uplink transmissions and wherein the one or more processors are further configured to:
   transmit, after transmitting the skip indicator, a cancellation of the skip indicator for the uplink transmission.

23. The UE of claim 21, wherein to transmit the RMI, the one or more processors are configured to transmit a skip indicator using a particular message, wherein the particular message is a medium access control (MAC) control element, downlink control information, a wake up signal, or a sequence based indicator, and wherein the particular message is associated with at least one of:
   a bit sequence,
   a skip indication,
   a skip length,
   a skip duration,
   an identification of a skipped uplink transmission,
   an identification of a resource for uplink control information multiplexing, or
   a carrier identifier.

24. The UE of claim 21, wherein the data is one or more values for a pose parameter identifying at least one of a rotational position or a translational position of the UE or a component associated therewith.

25. A network entity for wireless communication, comprising:
   a memory; and
   one or more processors, coupled to the memory, configured to:
   transmit information identifying a set of uplink resources for a set of uplink transmissions;
   receive a subset of the set of uplink transmissions, wherein the subset of the set of uplink transmissions includes uplink control information multiplexed from a remainder of the set of uplink transmissions corresponding to one or more instances in which data is not available for transmission; and
   receiving resource modification information (RMI) identifying a resource, of the set of uplink resources, in which an uplink transmission, of the remainder of the set of uplink transmissions, is not to occur.

26. The network entity of claim 25, wherein to receive the RMI the one or more processors are configured to receive a skip indicator for an uplink transmission, of the set of uplink transmissions and wherein the one or more processors are further configured to:

receive, after transmitting the skip indicator, a cancellation of the skip indicator for the uplink transmission.

27. The network entity of claim 25, wherein to receive the RMI the one or more processors are configured to receive a skip indicator using a particular message, wherein the particular message is a medium access control (MAC) control element, downlink control information, a wake up signal, or a sequence based indicator, and
  wherein the particular message is associated with at least one of:
  a bit sequence,
  a skip indication,
  a skip length,
  a skip duration,
  an identification of a skipped uplink transmission,
  an identification of a resource for uplink control information multiplexing, or
  a carrier identifier.

28. The network entity of claim 25, wherein the data is one or more values for a pose parameter identifying at least one of a rotational position or a translational position.

\* \* \* \* \*